(12) United States Patent
Shimezawa et al.

(10) Patent No.: US 12,095,696 B2
(45) Date of Patent: Sep. 17, 2024

(54) DEVICE, METHOD AND MEDIUM FOR PERFORMING PROCESSING BASED ON CONTROL INFORMATION

(71) Applicant: Sony Group Corporation, Tokyo (JP)

(72) Inventors: Kazuyuki Shimezawa, Kanagawa (JP); Naoki Kusashima, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 187 days.

(21) Appl. No.: 17/539,232

(22) Filed: Dec. 1, 2021

(65) Prior Publication Data

US 2022/0094501 A1 Mar. 24, 2022

Related U.S. Application Data

(63) Continuation of application No. 16/474,552, filed as application No. PCT/JP2017/042298 on Nov. 24, 2017, now abandoned.

(30) Foreign Application Priority Data

Jan. 6, 2017 (JP) ................... 2017-000866

(51) Int. Cl.
*H04L 5/00* (2006.01)
*H04L 27/26* (2006.01)
*H04W 72/23* (2023.01)

(52) U.S. Cl.
CPC .......... *H04L 5/0051* (2013.01); *H04L 5/0037* (2013.01); *H04L 5/0053* (2013.01);
(Continued)

(58) Field of Classification Search
CPC ................. H04L 5/0051; H04L 5/0037; H04L 27/26025; H04L 5/0092; H04L 5/0053; H04W 72/23
See application file for complete search history.

(56) References Cited

U.S. PATENT DOCUMENTS

2015/0312958 A1 10/2015 Cheng et al.
2016/0029351 A1 1/2016 Shimezawa et al.

OTHER PUBLICATIONS

International Search Report and Written Opinion mailed on Jan. 30, 2018 for PCT/JP2017/042298 filed on Nov. 24, 2017, 9 pages including English Translation of the International Search Report.
(Continued)

*Primary Examiner* — Omar J Ghowrwal
(74) *Attorney, Agent, or Firm* — XSENSUS LLP

(57) ABSTRACT

Provided is a mechanism capable of improving the transmission efficiency of the entire system in a case where dynamic resource sharing is performed.
A terminal device includes: an acquisition unit that acquires first control information and second control information provided in notification from a base station device; and a reception processing unit that performs reception processing of a first data channel scheduled to a first resource, and a reference signal for demodulating the first data channel, on the basis of the first control information, in which the reception processing unit performs the reception processing of the first data channel mapped to a resource other than a second resource that is a part of the first resource in the first resource on the basis of the second control information on the assumption that the reference signal is mapped to the first resource including the second resource.

4 Claims, 15 Drawing Sheets

(52) U.S. Cl.
CPC ....... *H04L 27/26025* (2021.01); *H04W 72/23* (2023.01); *H04L 5/0092* (2013.01)

(56) References Cited

OTHER PUBLICATIONS

3GPP, "3rd Generation Partnership Project; Technical Specification Group Radio Access Network; Study on Scenarios and Requirements for Next Generation Access Technologies", 3GPP TR 38.913 V0.3.0, Mar. 2016, Release 14, pp. 1-30.
Sony, "Dynamic Resource Sharing for eMBB/URLLC in DL", 3GPP TSG RAN WG1 Meeting No. 87 R1-1611545, Lisbon, Portugal, Oct. 10-14, 2016, 5 pages.
Sony, "Time Domain Structure of DL Physical Control Channel for NR", 3GPP TSG RAN WG1 Meeting No. 87 R1-1612891, Reno, Nevada, USA, Nov. 14-18, 2016, 9 pages.
ZTE et al., "Considerations on design aspects for NR URLLC", 3GPP TSG RAN WG1 Meeting No. 87 R1-1611294, Reno, USA, Nov. 14-18, 2016, pp. 1-4.
OPPO, "Subcarrier spacing design for data and reference signal", 3GPP TSG RAN WG1 Meeting No. 86bis R1-1608900, Lisbon, Portugal, Oct. 10-14, 2016, 8 pages.
LG Electronics, "Discussion on control and data transmission of URLLC", 3GPP TSG RAN WG1 Meeting No. 86bis R1-1609237, Lisbon, Portugal, Oct. 10-14, 2016, pp. 1-5.
Ericsson, "Summary of e-mail discussions on downlink control signaling", TSG-RAN WG1 Meeting No. 87 R1-1612908, Reno, NV, USA, Nov. 14-18, 2016, 39 pages.
Samsung, "eMBB and URLLC multiplexing in DL", 3GPP TSG RAN WG1 Meeting No. 87 R1-1612540, Reno, USA, Nov. 14-18, 2016, pp. 1-5.
Extended European Search Report dated Nov. 18, 2019, issued in corresponding European Patent Application No. 17890786.1, 19 pages.
Evaluation Results of Superposition for Multiplexing eMBB and URLLC, Discussion and Decision, 3GPP TSG RAN WG1 Meeting #87, Reno, USA, Nov. 14-18, 2016, R1-1612537, 5 pages.

DEVICE, METHOD AND MEDIUM FOR PERFORMING PROCESSING BASED ON CONTROL INFORMATION

CROSS-REFERENCE TO RELATED APPLICATIONS

This application is a continuation of U.S. application Ser. No. 16/474,552, filed Jun. 28, 2019, which is based on PCT filing PCT/JP2017/042298, filed Nov. 24, 2017, and claims priority to Japanese Application No. 2017-000866, filed Jan. 6, 2017, the entire contents of each are incorporated herein by reference.

TECHNICAL FIELD

The present disclosure relates to a terminal device, a base station device, a method, and a recording medium.

BACKGROUND ART

Radio access scheme for cellular mobile communication and radio network (hereinafter, also referred to as "long term evolution (LTE)", "LTE-advanced (LTE-A)", "LTE-advanced pro (LTE-A Pro)", "new radio (NR)", "new radio access technology (NRAT)", "evolved universal terrestrial radio access (EUTRA)", or "further EUTRA (FEUTRA)", have been considered in the third generation partnership project (3GPP). Note that, in the following description, the LTE includes the LTE-A, the LTE-A Pro, and the EUTRA, and the NR includes the NRAT and the FEUTRA. A base station device (base station) is also referred to as an evolved NodeB (eNodeB) in the LTE, and is also referred to as a gNodeB in the NR. Furthermore, a terminal device (a mobile station, a mobile station device, a terminal) is also referred to as a user equipment (UE) in the LTE and the NR. The LTE and the NR are cellular communication systems in which a plurality of areas covered by the base station device is arranged in a cell. A single base station device may manage a plurality of cells.

The NR is a radio access technology (RAT) different from the LTE as a next-generation radio access scheme for the LTE. The NR is an access technology that can support various use cases including the enhanced mobile broadband (eMBB), the massive machine type communications (mMTC), and the ultra reliable and low latency communications (URLLC). The NR is considered aiming at a technical framework corresponding to usage scenarios, requirements, deployment scenarios, and the like in those use cases. Details of the NR scenarios and requirements are disclosed in Non-Patent Document 1.

Here, the eMBB is broadband transmission, and data transmission is performed in slot units. Furthermore, the URLLC includes low latency transmission, and data transmission is performed in time units (minislots) shorter than slots. In other words, the transmission time interval (TTI) in the URLLC is shorter than the TTI in the eMBB. Therefore, data transmission of the URLLC may occur after data transmission of the eMBB has already started. Although frequency division multiplexing can be considered as one of methods to multiplex eMBB data and URLLC data, it is necessary to secure frequency resources for URLLC data transmission, and in a case where the occurrence frequency of URLLC data transmission is low, resource utilization efficiency will be reduced.

Therefore, in the NR, dynamic resource sharing between the eMBB and the URLLC is considered. In the dynamic resource sharing between the eMBB and the URLLC, in a case where data transmission of the URLLC occurs, the data of the URLLC is transmitted using (taking over) the resource in the slot where the eMBB data is transmitted. In other words, the URLLC data is mapped to the resource prior to the eMBB data and transmitted. In the eMBB data, resources used for URLLC data transmission (resources taken over) are punctured. Details of dynamic resource sharing between the eMBB and the URLLC are disclosed in Non-Patent Document 2.

CITATION LIST

Non-Patent Document

Non-Patent Document 1: 3rd Generation Partnership Project; Technical Specification Group Radio Access Network; Study on Scenarios and Requirements for Next Generation Access Technologies; (Release 14), 3GPP TR 38.913 V0.3.0 (2016-03). [Searched on Dec. 22, 2016], Internet <URL: http://www.3gpp.org/ftp/Specs/archive/38_series/38.913/38913-030.zip>

Non-Patent Document 2: R1-1611545, "Dynamic Resource Sharing for eMBB/URLLC in DL," Sony, 3GPP TSG RAN WG1 Meeting #87, October 2016. [Searched on Dec. 22, 2016], Internet <URL: http://www.3gpp.org/ftp/tsg_ran/WG1_RL1/TSGR1_87/Docs/R1-1611545.zip>

SUMMARY OF THE INVENTION

Problems to be Solved by the Invention

In a case where data of different communication standards are transmitted by resource sharing, such as dynamic resource sharing between the eMBB and the URLLC, it is desirable that each piece of data is correctly received at the receiving side. For example, it is assumed that a part of resources for transmitting first data of a first communication standard is punctured, and data of a second communication standard is transmitted in the punctured resource. In this case, when a demodulation reference signal for the first data (for example, demodulation reference signal (DMRS)) is also punctured, the characteristics for the first data are greatly affected.

Thus, the present disclosure provides a mechanism capable of improving the transmission efficiency of the entire system in a case where dynamic resource sharing is performed.

Solutions to Problems

According to the present disclosure, provided is a terminal device including: an acquisition unit that acquires first control information and second control information provided in notification from a base station device; and a reception processing unit that performs reception processing of a first data channel scheduled to a first resource, and a reference signal for demodulating the first data channel, on the basis of the first control information, in which the reception processing unit performs the reception processing of the first data channel mapped to a resource other than a second resource that is a part of the first resource in the first resource on the basis of the second control information on the assumption that the reference signal is mapped to the first resource including the second resource.

Furthermore, according to the present disclosure, provided is a terminal device including: an acquisition unit that acquires third control information provided in notification from a base station device; and a reception processing unit that performs reception processing of a second data channel scheduled to a second resource that is a part of a first resource on the basis of the third control information, in which the reception processing unit performs the reception processing on the assumption that the second data channel is mapped to a resource other than a third resource that is a part of the second resource in the second resource.

Furthermore, according to the present disclosure, provided is a base station device including: a notification unit that notifies a first terminal device of first control information associated with a first resource for the first terminal device, and second control information associated with a second resource for a second terminal device that is a part of the first resource; a data channel transmission unit that maps a first data channel to a resource other than the second resource in the first resource while scheduling the first data channel to the first resource; and a reference signal transmission unit that maps a reference signal for demodulating the first data channel to the first resource including the second resource.

Furthermore, according to the present disclosure, provided is a base station device including: a notification unit that notifies a second terminal device of third control information associated with a second resource for the second terminal device that is a part of a first resource for a first terminal device; and a data channel transmission unit that maps a second data channel to a resource other than a third resource that is a part of the second resource in the second resource while scheduling the second data channel to the second resource.

Furthermore, according to the present disclosure, provided is a method including: acquiring first control information and second control information provided in notification from a base station device; and performing, by a processor, reception processing of a first data channel scheduled to a first resource, and a reference signal for demodulating the first data channel, on the basis of the first control information, in which the performing the reception processing includes performing the reception processing of the first data channel mapped to a resource other than a second resource that is a part of the first resource in the first resource on the basis of the second control information on the assumption that the reference signal is mapped to the first resource including the second resource.

Furthermore, according to the present disclosure, provided is a method including: acquiring third control information provided in notification from a base station device; and performing, by a processor, reception processing of a second data channel scheduled to a second resource that is a part of a first resource on the basis of the third control information, in which the performing the reception processing includes performing the reception processing on the assumption that the second data channel is mapped to a resource other than a third resource that is a part of the second resource in the second resource.

Furthermore, according to the present disclosure, provided is a method including: notifying a first terminal device of first control information associated with a first resource for the first terminal device, and second control information associated with a second resource for a second terminal device that is a part of the first resource; mapping, by a processor, a first data channel to a resource other than the second resource in the first resource while scheduling the first data channel to the first resource; and mapping a reference signal for demodulating the first data channel to the first resource including the second resource.

Furthermore, according to the present disclosure, provided is a method including: notifying a second terminal device of third control information associated with a second resource for the second terminal device that is a part of a first resource for a first terminal device; and mapping, by a processor, a second data channel to a resource other than a third resource that is a part of the second resource in the second resource while scheduling the second data channel to the second resource.

Furthermore, according to the present disclosure, provided is a recording medium in which a program is recorded for causing a computer to function as: an acquisition unit that acquires first control information and second control information provided in notification from a base station device; and a reception processing unit that performs reception processing of a first data channel scheduled to a first resource, and a reference signal for demodulating the first data channel, on the basis of the first control information, in which the reception processing unit performs the reception processing of the first data channel mapped to a resource other than a second resource that is a part of the first resource in the first resource on the basis of the second control information on the assumption that the reference signal is mapped to the first resource including the second resource.

Furthermore, according to the present disclosure, provided is a recording medium in which a program is recorded for causing a computer to function as: an acquisition unit that acquires third control information provided in notification from a base station device; and a reception processing unit that performs reception processing of a second data channel scheduled to a second resource that is a part of a first resource on the basis of the third control information, in which the reception processing unit performs the reception processing on the assumption that the second data channel is mapped to a resource other than a third resource that is a part of the second resource in the second resource.

Furthermore, according to the present disclosure, provided is a recording medium in which a program is recorded for causing a computer to function as: a notification unit that notifies a first terminal device of first control information associated with a first resource for the first terminal device, and second control information associated with a second resource for a second terminal device that is a part of the first resource; a data channel transmission unit that maps a first data channel to a resource other than the second resource in the first resource while scheduling the first data channel to the first resource; and a reference signal transmission unit that maps a reference signal for demodulating the first data channel to the first resource including the second resource.

Furthermore, according to the present disclosure, provided is a recording medium in which a program is recorded for causing a computer to function as: a notification unit that notifies a second terminal device of third control information associated with a second resource for the second terminal device that is a part of a first resource for a first terminal device; and a data channel transmission unit that maps a second data channel to a resource other than a third resource that is a part of the second resource in the second resource while scheduling the second data channel to the second resource.

According to the present disclosure, even in a case where the second resource that is a part of the first resource is punctured, the reference signal for demodulating the first data channel mapped to the first resource is mapped also in the second resource. Therefore, a device of which a receiving target is the first resource can receive the reference signal for demodulating the first data channel without loss and can use the reference signal for demodulating the first data channel. This makes it possible to avoid characteristic degradation of the first data channel due to puncturing.

Effects of the Invention

As described above, according to the present disclosure, provided is a mechanism capable of improving the transmission efficiency of the entire system in a case where dynamic resource sharing is performed. Note that the effect described above is not necessarily limitative, and any of the effects shown in the present specification or other effects that can be understood from the present specification may be exhibited together with the effect described above, or instead of the effect described above.

MODE FOR CARRYING OUT THE INVENTION

Figure 1:
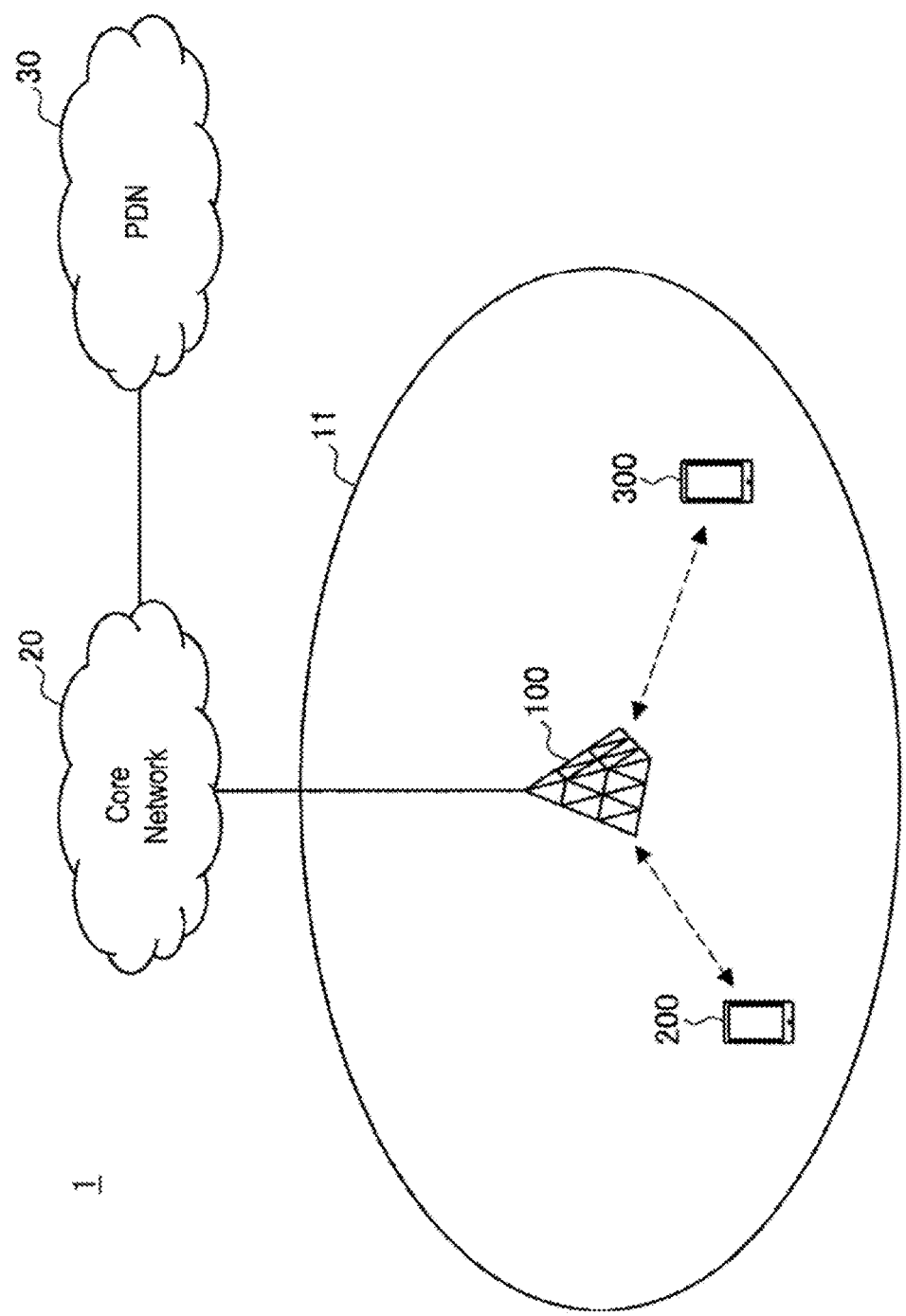
FIG. 1 is a diagram showing an overall configuration of a system according to an embodiment of the present disclosure.

Preferred embodiments of the present disclosure will be described in detail below with reference to the accompanying drawings. Note that, in the present specification and the drawings, the same reference numerals are given to the constituent elements having substantially the same functional configuration, and redundant explanations are omitted.

Note that the description will be given in the following order.
1. Introduction
 1.1. Overall Configuration
 1.2. Dynamic Resource Sharing
 1.3. Mapping Pattern of DMRS in NR
2. Configuration Example of Each Device
 2.1. Configuration Example of Base Station Device
 2.2. Configuration Example of eMBB Terminal
 2.3. Configuration Example of URLLC Terminal
3. Technical Features
 3.1. eMBB Processing
 3.2. URLLC Processing
  3.2.1. Case Where RE Sizes are the Same
  3.2.2. Case Where RE Sizes are Different
  3.2.3. CSI Feedback
4. Application Example
5. Conclusion 1. Introduction 1.1. Overall Configuration FIG. 1 is a diagram showing an overall configuration of a system according to an embodiment of the present disclosure. As shown in FIG. 1, a system 1 includes a base station device 100, a terminal device 200, a terminal device 300, a core network 20, and a packet data network (PDN) 30.

The base station device 100 operates a cell 11 and provides a wireless communication service to one or more terminal devices located inside the cell 11. The cell 11 is operated according to any wireless communication scheme such as LTE or NR, for example. The base station device 100 is connected to the core network 20. The core network 20 is connected to the PDN 30 via a gateway device (not shown).

The core network 20 may include, for example, a mobility management entity (MME), a serving gateway (S-GW), a PDN gateway (P-GW), a policy and charging rule function (PCRF), and a home subscriber server (HSS). The MME is a control node that handles control plane signals, and manages the movement state of the terminal device. The S-GW is a control node that handles user plane signals, and is a gateway device that switches a transfer path of user data. The P-GW is a control node that handles user plane signals, and is a gateway device serving as a connection point between the core network 20 and the PDN 30. The PCRF is a control node that performs control on policies such as the quality of service (QoS) for a bearer, and charging. The HSS is a control node that handles subscriber data and performs service control.

The terminal device 200 and the terminal device 300 wirelessly communicate with the base station device 100 on the basis of control by the base station device 100. The terminal device 200 and the terminal device 300 may be so-called user terminals (user equipment (UE)). For example, the terminal device 200 and the terminal device 300 transmit uplink signals to the base station device 100 and receive downlink signals from the base station device 100.

In particular, the terminal device 200 is an eMBB terminal that transmits and receives an eMBB signal to and from the base station device 100. Furthermore, the terminal device 300 is a URLLC terminal that transmits and receives a URLLC signal to and from the base station device 100.

1.2. Dynamic Resource Sharing

Resources for communication may be divided and used in blocks having predetermined time intervals and predetermined frequency intervals. Such blocks are also referred to as resource blocks (RBs). The RB may include one or more subframes or slots in the time direction. Furthermore, the RB includes a set of subcarriers in the frequency direction. Note that the frequency interval of the RB may be referred to as a resource block.

In the NR, data with different transmission time interval (TTI) lengths, such as the eMBB and the URLLC, may be flexibly transmitted. Furthermore, in order to improve the utilization efficiency of frequency resources, a plurality of pieces of data with different TTI lengths may be transmitted by dynamic resource sharing in a predetermined resource.

Figure 2:
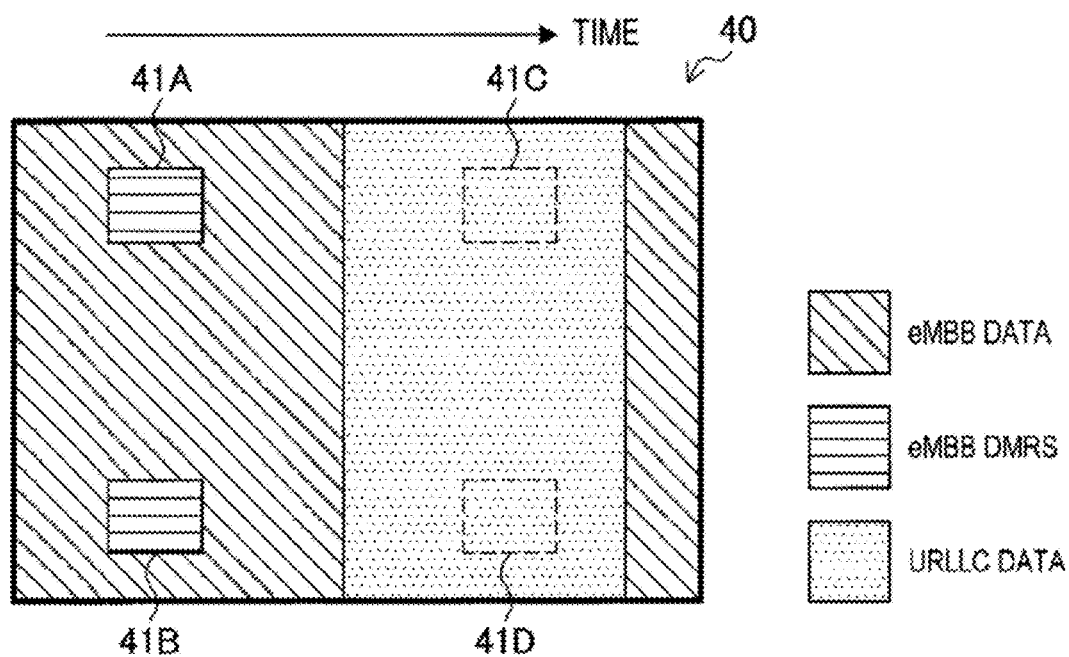
FIG. 2 is a diagram for explaining an example of typical dynamic resource sharing.

FIG. 2 is a diagram for explaining an example of typical dynamic resource sharing. The horizontal axis in FIG. 2 is time, the vertical axis is frequency, and one RB 40 is shown. In the RB 40 shown in FIG. 2, the eMBB data and the eMBB DMRS are transmitted. However, some resources in the RB are punctured, and data of the URLLC is transmitted in the punctured resources. In other words, in the dynamic resource sharing between the eMBB and the URLLC, the URLLC data is preferentially transmitted, and part of the eMBB data is punctured.

During the dynamic resource sharing, puncturing may be performed. Puncturing refers to removing (in other words, dropping) a data symbol of a resource element (RE) to be punctured. In other words, data symbols for the punctured receiving device are not mapped to the resource element to be punctured.

In a case where the receiving device does not know that puncturing is performed, reception processing is performed including also the data symbol of the RE to be punctured, and the error rate characteristic is degraded. In particular, in a case where high reliability communication is required, such as the URLLC, it is desirable that such characteristic degradation be avoided.

On the other hand, in a case where the receiving device knows that puncturing is performed, reception processing is performed assuming that the data symbol of the RE to be punctured is not received, and the error characteristic degradation can be avoided. For example, information associated with puncturing for the eMBB data may be provided in notification by control information (for example, control channel) mapped to a predetermined resource. For example, information associated with puncturing performed in an RB may be provided in notification by control information mapped to a last symbol of the RB, a PDCCH region in an RB at a time later than the RB, or the like.

In the example shown in FIG. 2, the eMBB DMRS may be transmitted using four REs 41A to 41D in one RB. However, although the eMBB DMRS is transmitted in the two REs 41A and 41B in the first half, the two REs 41C and 41D in the second half are punctured for the data transmission of the URLLC and the eMBB DMRS is not transmitted. The DMRS is important for reception processing on the receiving side since the DMRS is a reference signal for estimating transmission line fluctuation for data. Therefore, as in the example shown in FIG. 2, in a case where the eMBB DMRS is punctured, the transmission characteristic is degraded even if the information associated with the puncturing for the eMBB data is provided in notification.

Therefore, it is desirable to provide a mechanism for preventing degradation of the transmission characteristic of data on the punctured side in the dynamic resource sharing.

1.3. Mapping Pattern of DMRS in NR

In the NR, a plurality of types of DMRS mapping patterns are defined depending on the moving speed of the UE, use cases, or the like, and these may be switched and used. An example of the mapping patterns of the eMBB DMRS will be described below with reference to FIGS. 3 and 4.

Figure 3:
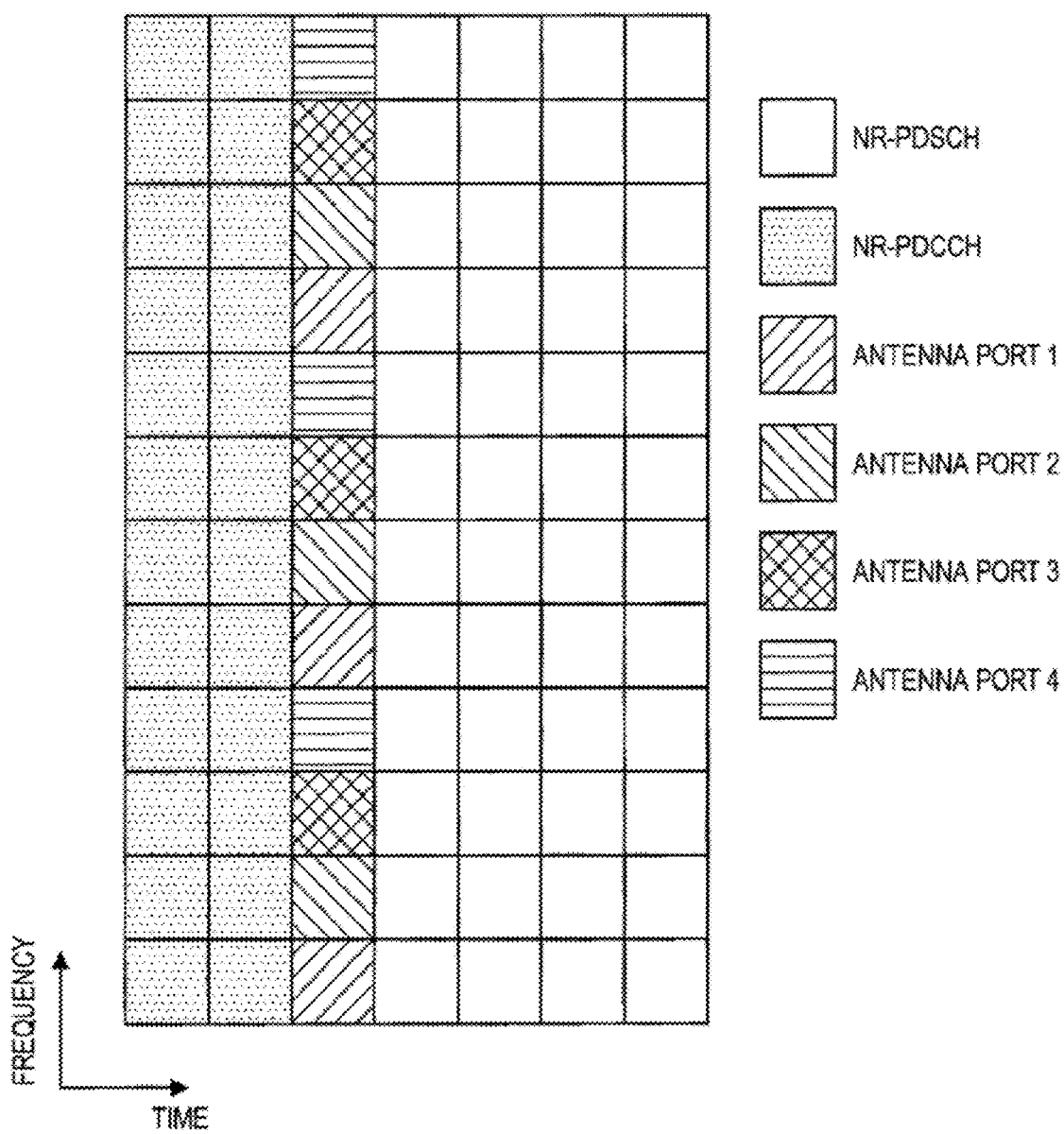
FIG. 3 is a diagram showing an example of a mapping pattern of an eMBB DMRS.
Figure 4:
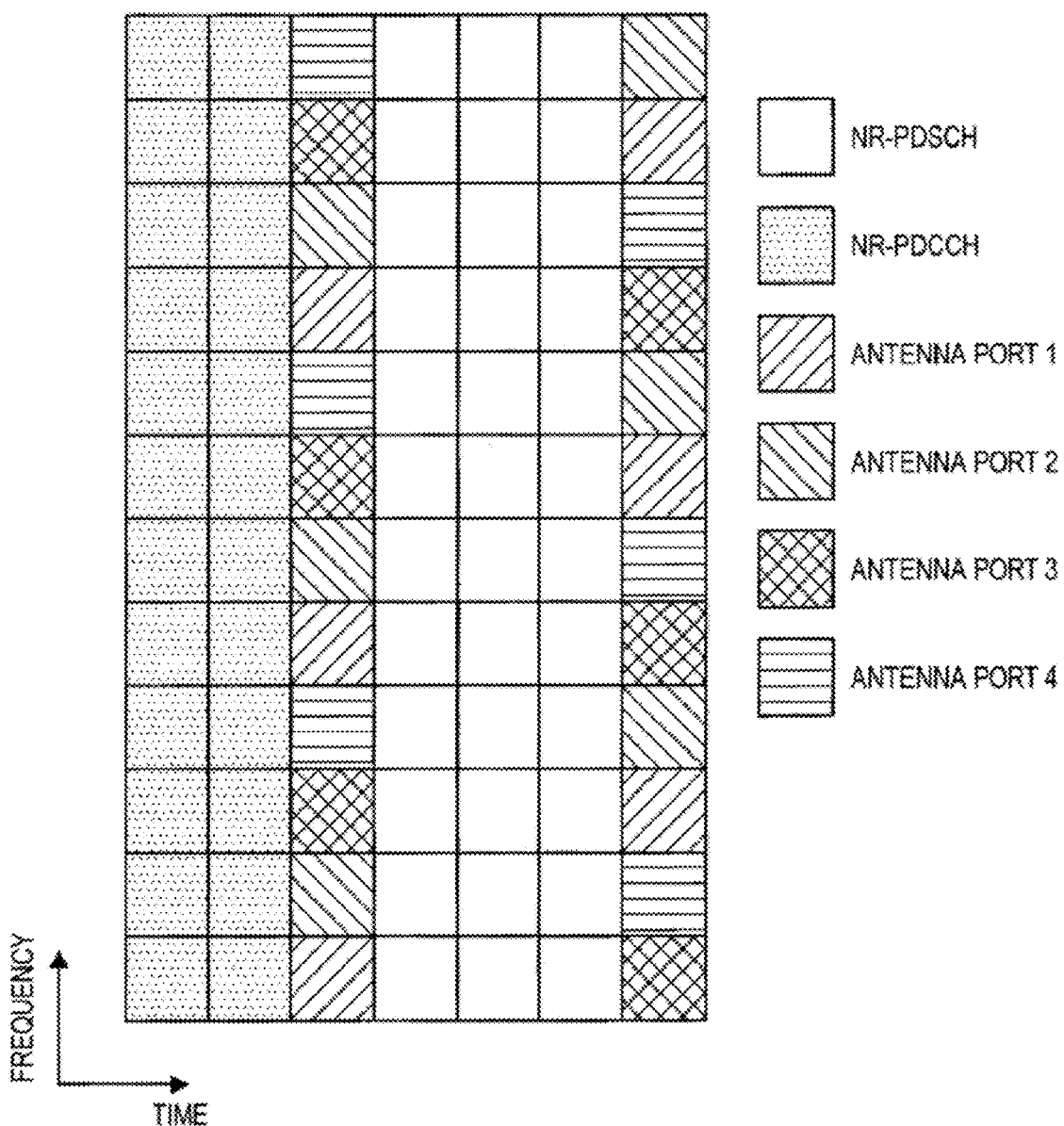
FIG. 4 is a diagram showing an example of a mapping pattern of an eMBB DMRS.

FIGS. 3 and 4 are diagrams showing an example of the mapping patterns of the eMBB DMRS. In these examples, the horizontal axis is time, the vertical axis is frequency, and one rectangle is the RE including one subcarrier and one symbol. Furthermore, it is assumed that one slot includes seven symbols.

In FIG. 3, the DMRSs corresponding to antenna ports 1 to 4 are mapped to the third symbol. In FIG. 4, the DMRSs corresponding to antenna ports 1 to 4 are mapped to the third and seventh symbols. The DMRS shown in FIG. 3 is suitable in a case where transmission line fluctuation in the time domain is slow, and has less DMRS overhead than that in a case of the DMRS shown in FIG. 4. The DMRS shown in FIG. 4 is suitable in a case where transmission line fluctuation in the time domain is fast, and has better receiving characteristics at high speed movement than in a case of the DMRS shown in FIG. 3.

Furthermore, FIGS. 3 and 4 show a case where the DMRSs corresponding to antenna ports 1 to 4 are mapped, but the number of layers (the number of space multiplexing) of multi-input multi-output (MIMO) in the PDSCH may cause the mapping of the DMRSs to fluctuate.

For example, in a case where the layer number of the PDSCH is 1, DMRSs associated with the PDSCH are mapped to only the antenna port 1 and transmitted. In other words, in that case, the REs corresponding to the DMRSs of the antenna ports 2 to 4 may be used for the PDSCH transmission. Furthermore, for example, in a case where the number of PDSCH layers is two, the DMRSs associated with the PDSCH are mapped only to the antenna ports 1 and 2 and transmitted. In other words, in that case, the REs corresponding to the DMRSs of the antenna ports 3 and 4 may be used for the PDSCH transmission. Furthermore, for example, in a case where the number of PDSCH layers is three, the DMRSs associated with the PDSCH are mapped only to the antenna ports 1 to 3 and transmitted. In other words, in that case, the REs corresponding to the DMRSs of the antenna port 4 may be used for the PDSCH transmission. Furthermore, for example, in a case where the number of PDSCH layers is four, the DMRSs associated with the PDSCH are mapped with all the antenna ports 1 to 4 and transmitted.

As described above, regarding the eMBB DMRS, in addition to a plurality of types of mapping patterns of the DMRS, the mapping of the DMRS used for actual transmission fluctuates depending on the number of PDSCH layers.

2. Configuration Example of Each Device

A configuration example of each device will be described below with reference to FIGS. 5 to 7.

2.1. Configuration Example of Base Station Device

Figure 5:
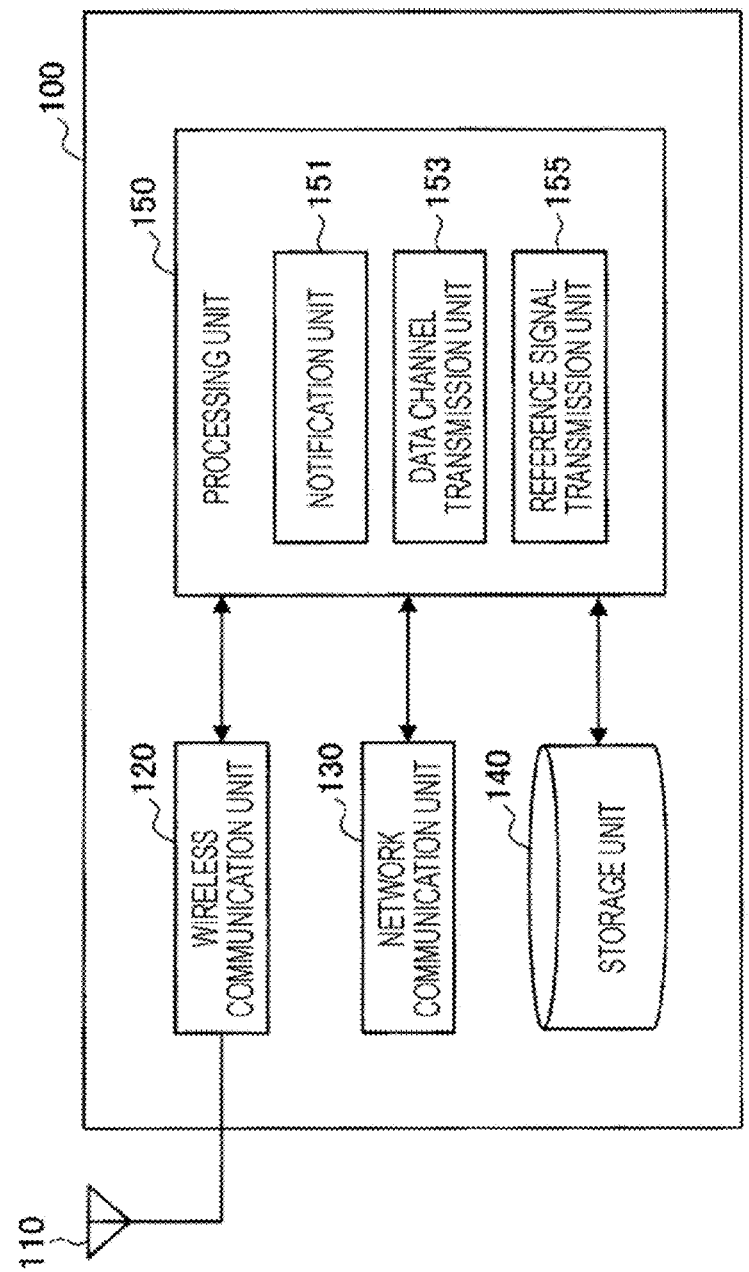
FIG. 5 is a block diagram showing a configuration example of a base station device according to the present embodiment.

FIG. 5 is a block diagram showing a configuration example of the base station device 100 according to the present embodiment. Referring to FIG. 5, the base station device 100 includes an antenna unit 110, a wireless communication unit 120, a network communication unit 130, a storage unit 140, and a processing unit 150.

(1) Antenna Unit 110

The antenna unit 110 radiates the signal output from the wireless communication unit 120 into space as a radio wave. Furthermore, the antenna unit 110 converts a radio wave in space into a signal, and outputs the signal to the wireless communication unit 120.

(2) Wireless Communication Unit 120

The wireless communication unit 120 transmits and receives signals. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to other nodes and receives information from other nodes. For example, the other nodes include other base stations and core network nodes.

(4) Storage Unit 140

The storage unit 140 temporarily or permanently stores programs for operation of the base station device 100 and various pieces of data.

(5) Processing Unit 150

The processing unit 150 provides various functions of the base station device 100. The processing unit 150 includes a notification unit 151, a data channel transmission unit 153, and a reference signal transmission unit 155. The notification unit 151 notifies the eMBB terminal 200 and the URLLC terminal 300 of control information. The data channel transmission unit 153 transmits the eMBB data to the eMBB terminal 200. Furthermore, the data channel transmission unit 153 transmits the URLLC data to the URLLC terminal 300. The reference signal transmission unit 155 transmits the reference signal for demodulating the eMBB data to the eMBB terminal 200. Furthermore, the reference signal transmission unit 155 transmits, to the URLLC terminal 300, the reference signal for demodulating the URLLC data.

Note that the processing unit 150 may further include other components in addition to these components. In other words, the processing unit 150 may also perform operations other than the operations of these components.

2.2. Configuration Example of eMBB Terminal

Figure 6:
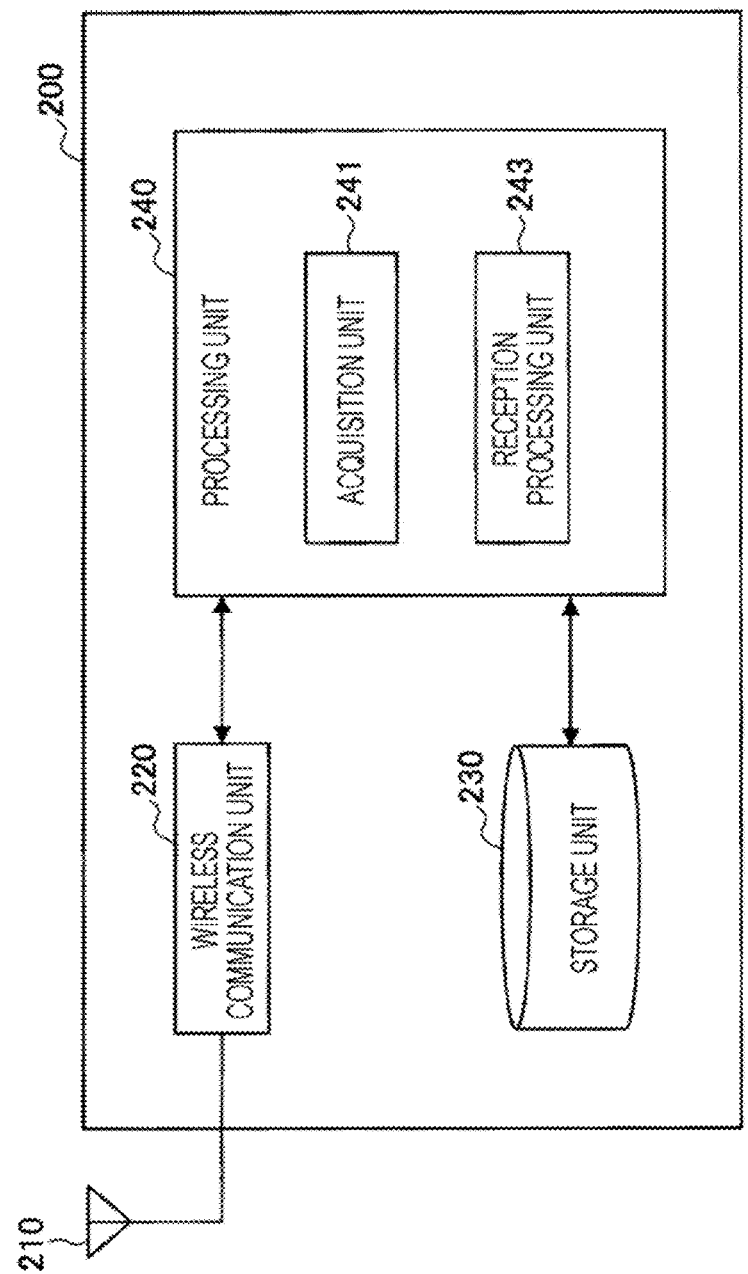
FIG. 6 is a block diagram showing a configuration example of an eMBB terminal according to the present embodiment.

FIG. 6 is a block diagram showing a configuration example of the eMBB terminal 200 according to the present embodiment. Referring to FIG. 6, the eMBB terminal 200 includes an antenna unit 210, a wireless communication unit 220, a storage unit 230, and a processing unit 240.

(1) Antenna Unit 210

The antenna unit 210 radiates the signal output from the wireless communication unit 220 into space as a radio wave. Furthermore, the antenna unit 210 converts a radio wave in space into a signal, and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs for operation of the eMBB terminal 200 and various pieces of data.

(4) Processing Unit 240

The processing unit 240 provides various functions of the eMBB terminal 200. The processing unit 240 includes an acquisition unit 241 and a reception processing unit 243. The acquisition unit 241 acquires control information provided in notification from the base station device 100. The reception processing unit 243 performs eMBB data reception processing on the basis of the control information acquired by the acquisition unit 241.

Note that the processing unit 240 may further include other components in addition to these components. In other words, the processing unit 240 may perform operations other than the operations of these components.

2.3. Configuration Example of URLLC Terminal

Figure 7:
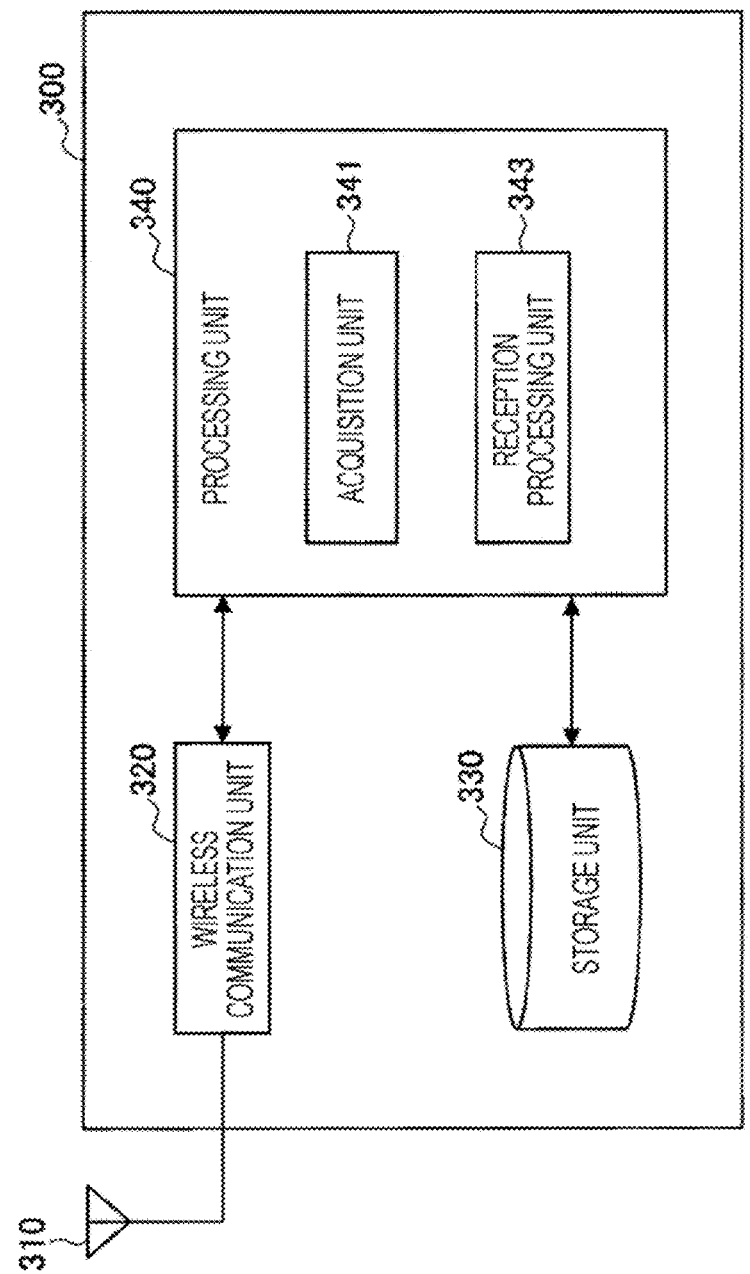
FIG. 7 is a block diagram showing an example of a configuration of a URLLC terminal according to the present embodiment.

FIG. 7 is a block diagram showing an example of a configuration of a URLLC terminal 300 according to the present embodiment. Referring to FIG. 7, the URLLC terminal 300 includes an antenna unit 310, a wireless communication unit 320, a storage unit 330, and a processing unit 340.

(1) Antenna Unit 310

The antenna unit 310 radiates the signal output from the wireless communication unit 320 into space as a radio wave. Furthermore, the antenna unit 310 converts a radio wave in space into a signal, and outputs the signal to the wireless communication unit 320.

(2) Wireless Communication Unit 320

The wireless communication unit 320 transmits and receives signals. For example, the wireless communication unit 320 receives a downlink signal from the base station and transmits an uplink signal to the base station.

(3) Storage Unit 330

The storage unit 330 temporarily or permanently stores programs for operation of the URLLC terminal 300 and various pieces of data.

(4) Processing Unit 340

The processing unit 340 provides various functions of the URLLC terminal 300. The processing unit 240 includes an acquisition unit 341 and a reception processing unit 343. The acquisition unit 341 acquires control information provided in notification from the base station device 100. The reception processing unit 343 performs URLLC data reception processing on the basis of the control information acquired by the acquisition unit 341.

Note that the processing unit 340 may further include other components in addition to these components. In other words, the processing unit 340 may also perform operations other than the operations of these components.

3. Technical Features 3.1. eMBB Processing

The eMBB terminal 200 receives eMBB data. The operation of the eMBB terminal 200 in a case where puncturing is performed will be described below.

(1) Puncturing

The eMBB terminal 200 recognizes that a part of resources for the eMBB data is punctured by the URLLC data.

Here, in a case where dynamic resource sharing of the URLLC and the eMBB is supported, the RE to which the eMBB DMRS is mapped is not a target of puncturing. In other words, the eMBB DMRS is transmitted without being punctured. Therefore, the eMBB terminal 200 can receive the eMBB DMRS and use the eMBB DMRS for demodulation.

(2) Control Information

The eMBB terminal 200 (for example, the acquisition unit 241) acquires first control information and second control information provided in notification from the base station device 100. Then, the eMBB terminal 200 performs reception processing on the basis of the first control information and the second control information.

The first control information includes information associated with a resource (also referred to as a first resource) on which the eMBB data is scheduled. In other words, the first control information includes control information provided in notification for scheduling (in other words, assignment) of the eMBB data (corresponding to the first data channel). The first resource may be taken as a time resource or section for which the eMBB data is scheduled.

The second control information includes control information associated with a resource (in other words, a second resource) to which the eMBB data is not actually mapped in the resource for which the eMBB data is scheduled. In other words, the second control information includes information associated with the punctured resource in the first resource. In the second resource, the URLLC data (corresponding to the second data channel) scheduled to the URLLC terminal 300 (corresponding to another device) communicating with the base station device 100 is mapped. The second resource may be taken as a time resource or section for which the URLLC data is scheduled.

Here, the second control information may be transmitted at a time later than the first control information. This is because a request for URLLC data transmission may occur after eMBB data transmission is started. In addition, it is preferable that the second control information be provided in notification prior to the notification of the response information (Ack/Nack information) for the data assigned by the first control information.

For example, the second control information may be transmitted in a resource block (in other words, a slot) including the resource being punctured. Specifically, the second control information may be transmitted in the last symbol in the resource block (in other words, a slot) including the resource being punctured. In this case, the second control information may be provided in notification using a physical channel different from the control channel used to provide notification of the first control information.

For example, the second control information may be transmitted in a resource block (in other words, a slot) after a resource block (in other words, a slot) including the resource being punctured. In this case, the second control information may be provided in notification using the same physical channel as the control channel used to provide notification of the first control information. Furthermore, the second control information may be transmitted by being included in the first control information provided in notification in a resource block (in other words, a slot) after a resource block (in other words, a slot) including the resource being punctured.

(3) Transmission Processing

The base station device 100 (for example, the notification unit 151) notifies the eMBB terminal 200 of the first control information and the second control information.

The base station device 100 (for example, the data channel transmission unit 153) transmits eMBB data to the eMBB terminal 200. Specifically, the base station device 100 maps eMBB data to a resource other than the second resource in the first resource while scheduling the eMBB data to the first resource. In other words, the base station device 100 punctures the second resource from the first resource, maps the eMBB data to the non-punctured resource in the first resource, and transmits the result.

The base station device 100 (for example, the reference signal transmission unit 155) transmits, to the eMBB terminal 200, a reference signal (in other words, eMBB DMRS) for demodulating the eMBB data. In particular, the base station device 100 maps the eMBB DMRS to the first resource including the second resource. In other words, the base station device 100 does not set the resource to which the eMBB DMRS is mapped as a target of puncturing for the URLLC data.

(4) Reception Processing

The eMBB terminal 200 performs reception processing on the basis of the first control information and the second control information.

Basically, on the basis of the first control information, the eMBB terminal 200 performs reception processing of the eMBB data scheduled to the first resource and the reference signal for demodulating the eMBB data (in other words, eMBB DMRS).

However, in a case where URLLC data is transmitted in a resource in which the eMBB data is scheduled, in other words, the first resource may be punctured. In that case, on the basis of the second control information, the eMBB terminal 200 performs reception processing of the first data channel to which a resource other than the second resource that is a part of the first resource in the first resource is mapped, on the assumption that the eMBB DMRS is mapped to the first resource including the second resource. In other words, the eMBB terminal 200 performs reception processing on the assumption that REs other than the REs to which the eMBB DMRS is mapped are punctured in the resource to be punctured designated by the second control information. More simply, the eMBB terminal 200 performs reception processing on the assumption that eMBB DMRS is not punctured. Therefore, the eMBB terminal 200 handles the signal received in the RE that is assumed to be mapped with the eMBB DMRS, as the eMBB DMRS even if the RE is included in the second resource.

As described above, even in a case where dynamic resource sharing is performed, the eMBB DMRS is not punctured, and therefore, it is possible to avoid the degradation of the eMBB data transmission characteristic.

The eMBB terminal 200 transmits response information to the base station device 100 on the basis of the result of the reception processing. The eMBB terminal 200 transmits, to the base station device 100, response information for data assigned by the first control information. In a case where the eMBB terminal 200 receives the second control information before transmitting the response information, the eMBB terminal 200 transmits the response information associated with the received data in the resources other than the resource to be punctured indicated by the second control information in the resource indicated by the first control information.

(5) Processing Flow

An example of the flow of eMBB data communication processing will be described below with reference to FIG. 8.

Figure 8:
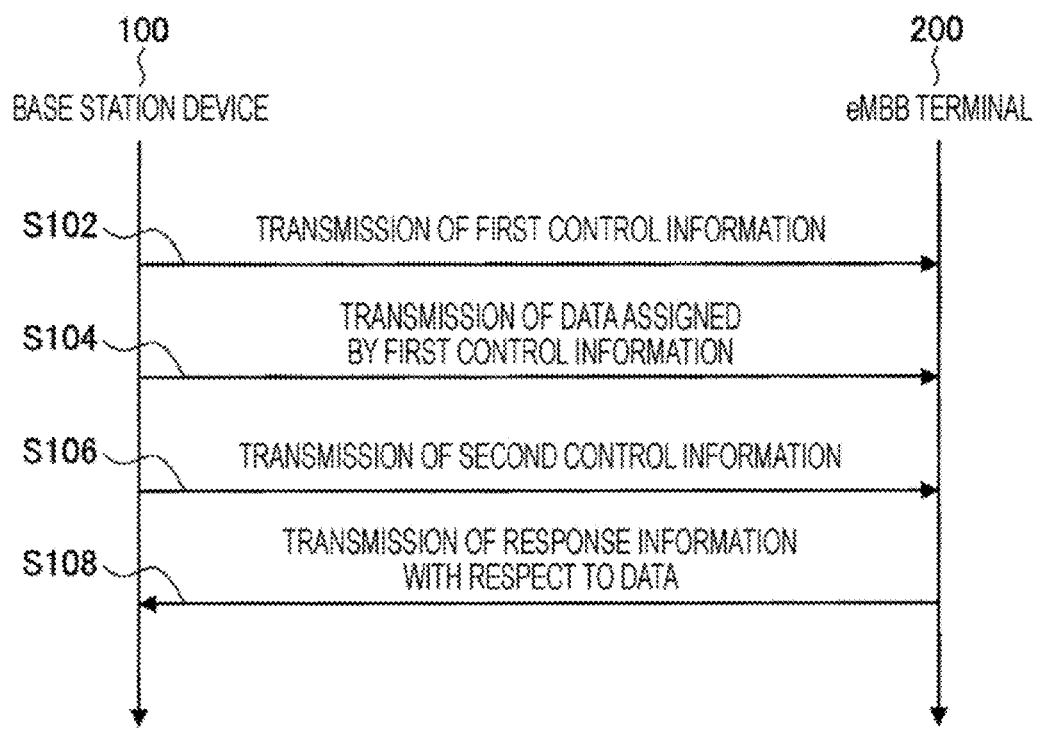
FIG. 8 is a sequence diagram showing an example of a flow of data communication processing of the eMBB executed in a system according to the present embodiment.

FIG. 8 is a sequence diagram showing an example of a flow of data communication processing of the eMBB executed in the system 1 according to the present embodiment. The base station device 100 and the eMBB terminal 200 are involved in this sequence.

First, the base station device 100 transmits the first control information to the eMBB terminal 200 (step S102). Next, the base station device 100 transmits the eMBB data to the eMBB terminal 200 in the first resource indicated by the first control information (step S104). Next, the base station device 100 transmits the second control information to the eMBB terminal 200 (step S106). Then, the eMBB terminal 200 performs reception processing on the basis of the first control information and the second control information, and transmits response information for the received eMBB data to the base station device 100 (step S108).

3.2. URLLC Processing

3.2.1. In a Case Where RE Size is the Same (1) Overview

The URLLC terminal 300 performs reception processing on the resource to which the URLLC data is mapped, and acquires the URLLC data.

As described above, even in a case where dynamic resource sharing is performed, eMBB DMRS is not punctured. In other words, the RE to which eMBB DMRS is mapped is punctured from the second resource. The puncturing for the second resource may also be referred to as RE puncturing.

Here, in the eMBB, a plurality of types of DMRS mapping patterns are defined depending on the moving speed of the UE, use cases, or the like, and these may be switched and used. The DMRS mapping pattern may be determined independently for each UE. Since those UEs are time-multiplexed and frequency-multiplexed, the DMRS mapping patterns may be different in both time direction and frequency direction. Furthermore, in a case where REs to which DMRSs are mapped are different for each antenna port, DMRS mappings may also differ depending on the number of PDSCH layers. This point will be specifically described with reference to FIG. 9.

Figure 9:
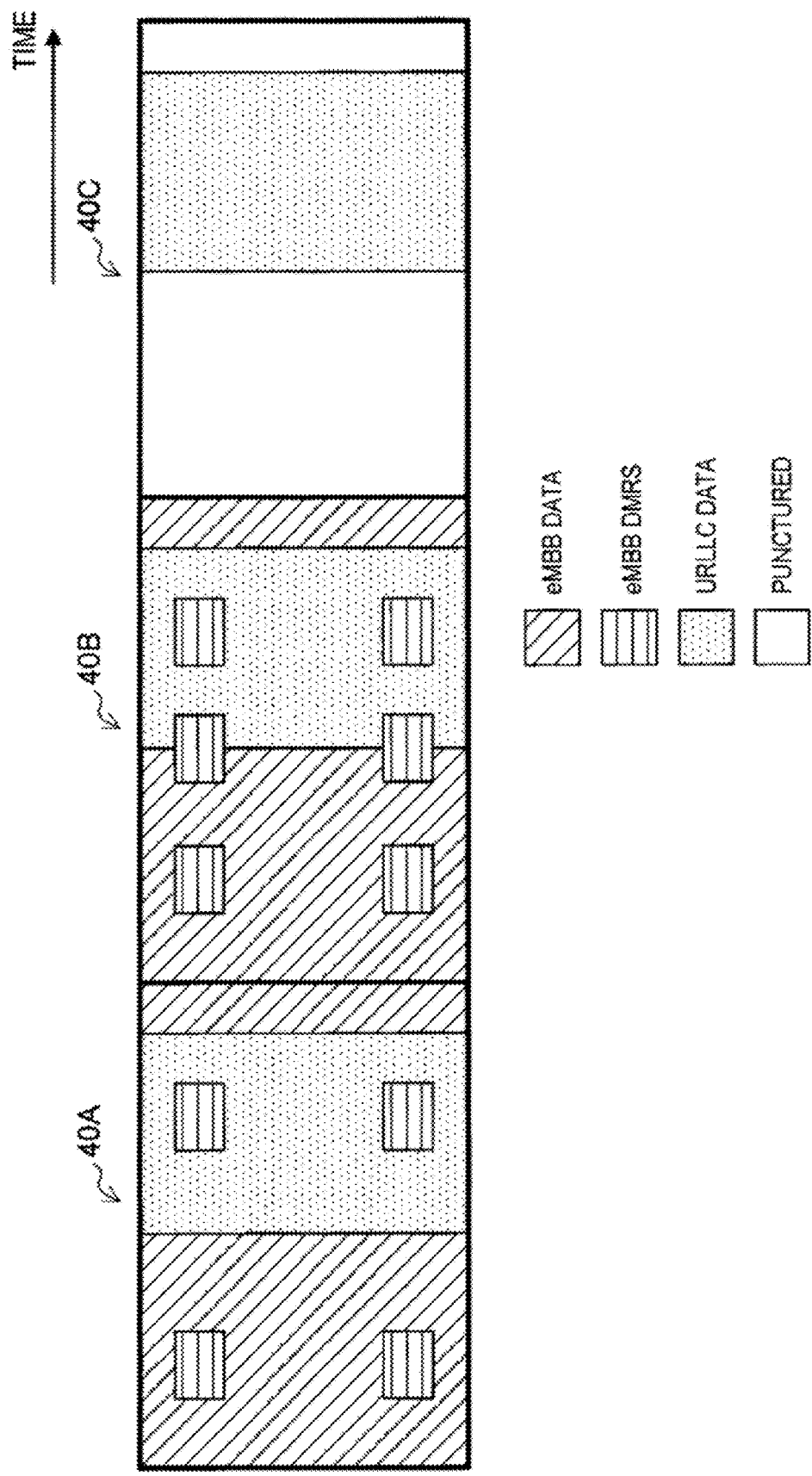
FIG. 9 is a diagram showing an example of dynamic resource sharing in different DMRS mapping patterns according to the present embodiment.

FIG. 9 is a diagram showing an example of dynamic resource sharing in different DMRS mapping patterns according to the present embodiment. The horizontal axis of FIG. 9 is time, the vertical axis is frequency, and three RBs 40A, 40B, and 40C that are successive in the time direction are shown. As shown in FIG. 9, in the RB40A, eMBB DMRSs are mapped to four REs, in the RB40B, eMBB DMRSs are mapped to six REs, and in the RB40C, eMBB data and eMBB DMRS are not transmitted. Furthermore, in each RB, URLLC data is transmitted.

In this example, since the mapping patterns of eMBB DMRS in the URLLC data are different, the puncturing pattern for the URLLC data is also different. Therefore, it is preferable that the URLLC terminal 300 recognize a mapping pattern of the eMBB DMRS (or the puncturing pattern for the URLLC data) that may be different for each RB.

(2) Relationship Between eMBB RE and URLLC RE

In the second resources, a resource to which URLLC data is not mapped (in other words, a resource to be punctured) is also referred to as a third resource. Furthermore, the RE to which eMBB DMRS is mapped is also referred to as a fourth resource. Then, the third resource includes a fourth resource to which the eMBB DMRS for demodulating the eMBB data mapped to the resource other than the second resource in the first resource is mapped. That is, the third resource is arranged so as to have the same size as the fourth resource and match the fourth resource, or arranged so as to have a size larger than the fourth resource and include the fourth resource.

Here, the size (in other words, the subcarrier spacing and/or the symbol length) may be the same or different between the eMBB RE and the URLLC RE.

In a case where the sizes of the eMBB RE and the URLLC RE are the same, the subcarrier spacing of the third resource is the same as the subcarrier spacing of the fourth resource, and the symbol length of the third resource is the same as the symbol length of the fourth resource. Then, in a case where the sizes of the eMBB RE and the URLLC RE are the same, the third resource and the fourth resource match. This case will be described in detail later with reference to FIG. 9.

On the other hand, in a case where the sizes of the eMBB RE and the URLLC RE are different, the subcarrier spacing of the third resource is different from the subcarrier spacing of the fourth resource, and/or the symbol length of the third resource is different from the symbol length of the fourth resource. Then, in a case where the sizes of the eMBB RE and the URLLC RE are different, the third resource and the fourth resource may not match. This case will be described in detail later with reference to FIG. 11.

In this section, the case where the sizes of the eMBB RE and the URLLC RE are the same will be described. On the other hand, the case where the sizes of the eMBB RE and the URLLC RE are different will be described in <3.2.2. Case Where RE Size is Different>.

(3) Transmission Processing

The base station device 100 (for example, the notification unit 151) notifies the URLLC terminal 300 (corresponding to the second terminal device) of the third control information. The third control information includes information associated with the second resource for the URLLC terminal 300 (corresponding to the second terminal device) that is a part of the first resource for the eMBB terminal 200 (corresponding to the first terminal device). More specifically, the third control information includes information associated with the resource for which the URLLC data is scheduled.

The base station device 100 (for example, the notification unit 151) may notify the URLLC terminal 300 of fourth control information including URLLC data reception setting information as described later.

The base station device 100 (for example, the data channel transmission unit 153) transmits the URLLC data to the URLLC terminal 300. Specifically, the base station device 100 maps the URLLC data to the resource other than the third resource that is a part of the second resource in the second resource, while scheduling the URLLC data to the second resource. In other words, the base station device 100 punctures the third resource from the second resource, maps the URLLC data to the non-punctured resource in the second resource, and transmits the result.

(4) Reception Processing

The URLLC terminal 300 (for example, the acquisition unit 341) acquires the third control information provided in notification from the base station device 100.

Then, the URLLC terminal 300 (for example, the reception processing unit 343) performs the reception processing of the second data channel scheduled to the second resource that is a part of the first resource on the basis of the third control information.

However, the URLLC terminal 300 performs the reception processing in consideration of RE puncturing for the second resource. Specifically, the URLLC terminal 300 performs reception processing on the assumption that the second data channel is mapped to the resource other than the third resource that is a part of the second resource in the second resource. In other words, the URLLC terminal 300 performs reception processing on the assumption that the RE to which the eMBB DMRS is mapped is punctured from the second resource specified by the third control information. That is, the URLLC terminal 300 handles REs assumed to be mapped with the eMBB DMRS as REs not to be received. As described above, the URLLC terminal 300 can avoid characteristic degradation of the URLLC data by excluding the eMBB DMRS from reception targets.

The URLLC terminal 300 receives the URLLC data on the basis of the URLLC data reception setting information that is the setting information associated with the mapping of the URLLC data.

The URLLC data reception setting information is information associated with a resource (in other words, a third resource) to which the URLLC data is not mapped in the second resource. In other words, the URLLC data reception setting information is information associated with a resource to be punctured in the second resource.

The URLLC data reception setting information may include information indicating a mapping pattern of the eMBB DMRS (in other words, information indicating a fourth resource). In that case, the URLLC terminal 300 performs the reception processing by puncturing the RE corresponding to the mapping pattern of the eMBB DMRS among the REs of the second resource. In other words, the URLLC terminal 300 performs reception processing on REs other than REs corresponding to the mapping pattern of the eMBB DMRS among the REs of the second resource. Note that, hereinafter, the mapping pattern of the eMBB DMRS may also be simply referred to as a mapping pattern.

The URLLC data reception setting information may include information indicating a puncturing pattern for the URLLC data in the second resource (in other words, information indicating the third resource). In that case, the URLLC terminal 300 performs reception processing on REs other than the punctured RE among the REs of the second resource. Note that, hereinafter, the puncturing pattern for the URLLC data in the second resource may be simply referred to as a puncturing pattern.

(2) Recognition Method of URLLC Data Reception Setting Information

The URLLC terminal 300 may recognize the URLLC data reception setting information, in other words, information indicating the third resource or information indicating the fourth resource in various methods.

Recognition Based on Specifications

The fourth resource may be predefined. In other words, the third resource may be predefined.

For example, the mapping pattern of the eMBB DMRS may be predefined in the specification. In that case, the URLLC terminal 300 performs the reception processing by puncturing the RE corresponding to the mapping pattern of the eMBB DMRS predefined according to the specification among the REs of the second resource.

The URLLC terminal 300 may perform reception processing on the assumption that the RE corresponding to the RE of the mapping pattern predefined is punctured regardless of the actual mapping of the eMBB DMRS.

The predefined mapping pattern may be determined on the basis of one or a plurality of mapping patterns among the mapping patterns of the eMBB DMRS defined in the specification. For example, the predefined mapping pattern may be determined on the basis of the mapping pattern of the eMBB DMRS defined by a predetermined subcarrier spacing (for example, 15 kHz). For example, the predefined mapping pattern may be determined on the basis of the mapping pattern of the eMBB DMRS that the eMBB terminal 200 uses as a default value.

In the predefined mapping pattern, the number of antenna ports to be punctured (or antenna port numbers) may be further defined. Furthermore, the number of antenna ports to be punctured (or antenna port numbers) may be set through radio resource control (RRC) signaling or downlink control information (DCI) signaling.

Recognition Based on Notification or Settings

For example, the URLLC data reception setting information (in other words, information indicating the third resource or information indicating the fourth resource) may be provided in notification or set as fourth control information. In that case, the URLLC terminal 300 acquires the URLLC data reception setting information provided in notification or set, and performs reception processing on the basis of the acquired URLLC data reception setting information.

The URLLC terminal 300 may recognize the URLLC data reception setting information based on notification or setting in various methods. Hereinafter, first to third examples will be described as an example.

Common Matters

First, matters common to the first to third examples will be described.

The URLLC terminal 300 performs reception processing by puncturing a predetermined RE determined on the basis of the mapping pattern set and/or provided in notification.

The mapping pattern set and/or provided in notification may be determined on the basis of one or a plurality of mapping patterns among the mapping patterns of the eMBB DMRS defined in the specification.

In the mapping pattern set and/or provided in notification, the number of antenna ports to be punctured (or antenna port numbers) may be further defined. Furthermore, the number of antenna ports to be punctured (or antenna port number) may be set through RRC signaling or DCI signaling.

First Example

The URLLC data reception setting information may be provided in notification semi-statically by RRC signaling, and may be set cell-specifically or UE-specifically.

The URLLC data reception setting information may be individually set for each RB or each RB group (frequency resource including a predetermined number of RBs) in the frequency domain.

In a case where the URLLC data reception setting information is not set, the URLLC terminal 300 performs reception processing by puncturing a predetermined RE determined on the basis of a predefined mapping pattern.

Second Example

The URLLC data reception setting information may be provided in notification dynamically by DCI signaling, and may be provided in notification cell-specifically, UE group-specifically, or UE-specifically. In other words, the URLLC data reception setting information may be provided in notification by being included in the DCI generated using a cell-specific, UE group-specific, or UE-specific radio network temporary identifier (RNTI).

The URLLC data reception setting information may be provided in notification periodically for every slot, every subframe, every slot group (a set of a predetermined number of consecutive slots), every subframe group (a set of a predetermined number of consecutive slots), or every radio frame. In that case, the URLLC data reception setting information may be applied to a predetermined time resource.

Furthermore, the URLLC data reception setting information may be provided in notification non-periodically. For example, in a case where the URLLC data reception setting information is provided in notification, the URLLC terminal 300 performs reception processing on the basis of the URLLC data reception setting information provided in notification. On the other hand, in a case where the URLLC data reception setting information is not provided in notification, the URLLC terminal 300 performs the reception processing on the basis of the previously defined or set mapping pattern.

Third Example

The URLLC data reception setting information may be provided in notification by a combination of RRC signaling and DCI signaling. For example, the candidate of the mapping pattern that can be provided in notification by DCI signaling described in the second example above is set by RRC signaling. Note that, even in a case where the setting is performed cell-specifically by RRC signaling, the DCI signaling may be provided in notification UE-group-specifically or UE-specifically.

Hereinafter, specific examples will be described.

For example, three mapping pattern candidates that can be adopted are set cell-specifically by RRC signaling. Then, information indicating which mapping pattern is adopted among the candidates is provided in notification UE-specifically by DCI signaling. In addition to the three set mapping pattern candidates, two-bit information (in other words, value or pattern) indicating any of four states including a case of not being punctured may be provided in notification by DCI signaling.

For example, one mapping pattern is UE-specifically set by RRC signaling. One bit of information indicating two states including a case where the set mapping pattern is adopted and a case where puncturing is not performed may be provided in notification by DCI signaling. The information provided in notification by the DCI signaling may be information indicating whether dynamic resource sharing is performed.

Hereinafter, an example of the flow of the URLLC data communication processing in the third example will be described with reference to FIG. 10.

Figure 10:
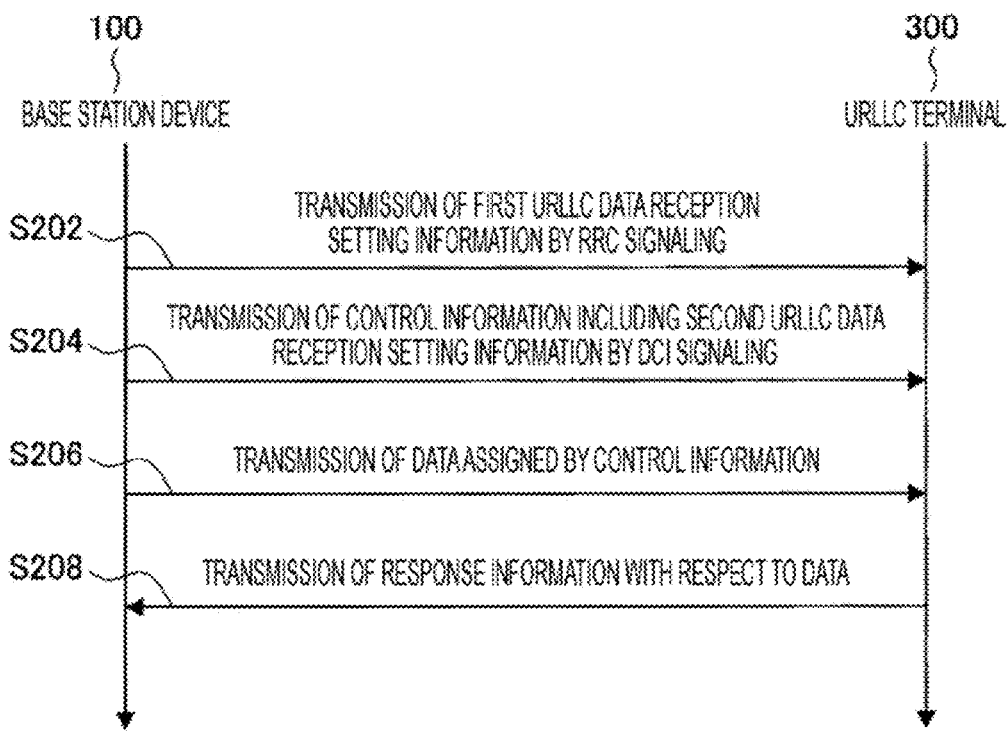
FIG. 10 is a sequence diagram showing an example of a flow of data communication processing of the URLLC performed in a system according to the present embodiment.

FIG. 10 is a sequence diagram showing an example of a flow of data communication processing of the URLLC performed in the system 1 according to the present embodiment. The base station device 100 and the URLLC terminal 300 are involved in this sequence.

First, the base station device 100 transmits first URLLC data reception setting information to the URLLC terminal 300 by RRC signaling (step S202). The first URLLC data reception setting information includes, for example, information indicating three mapping pattern candidates that can be adopted. Next, the base station device 100 transmits control information including second URLLC data reception setting information to the URLLC terminal 300 by DCI signaling (step S204). The second URLLC data reception setting information includes, for example, in addition to three mapping pattern candidates, two-bit information indicating any of four states including a case where puncturing is not performed. Next, the base station device 100 transmits URLLC data assigned by the control information (step S206). Then, the URLLC terminal 300 performs reception processing on the basis of the first URLLC data reception setting information and the second URLLC data reception setting information, and transmits response information for the received URLLC data to the base station device 100 (step S208).

3.2.2. Case Where RE Size is Different

Hereinafter, a case where the size (in other words, subcarrier spacing and/or symbol length) differs between the eMBB RE and the URLL RE will be described.

(1) Difference in RE Size

In the NR, signal waveforms of a plurality of types of subcarrier spacings are supported to correspond to various use cases and carrier frequencies. For example, the NR supports subcarrier spacings of 3.75 kHz, 7.5 kHz, 15 kHz, 30 kHz, 60 kHz, 120 kHz, 240 kHz and/or 480 kHz. Furthermore, the NR supports multiplexing of signal waveforms of different subcarrier spacings within one component carrier. The multiplexing includes frequency domain multiplexing and time domain multiplexing.

Then, even in a case where the subcarrier spacing used for the eMBB data and the subcarrier spacing used for the URLLC data are different, the above-described dynamic resource sharing may be supported. For example, a case can be considered in which the eMBB data is transmitted by a signal waveform of the subcarrier spacing of 15 kHz, and the eMBB data is transmitted by a signal waveform of the subcarrier spacing of 60 kHz.

In a case where the subcarrier spacings are different, the sizes of RE are different. In the above example, the size of the URLLC RE is four times the subcarrier spacing (in other words, wider) in the frequency direction and ¼ the symbol length in the time direction (in other words, shorter) as compared with the eMBB. Such a case where RE sizes are different will be described in detail with reference to FIG. 11.

Figure 11:
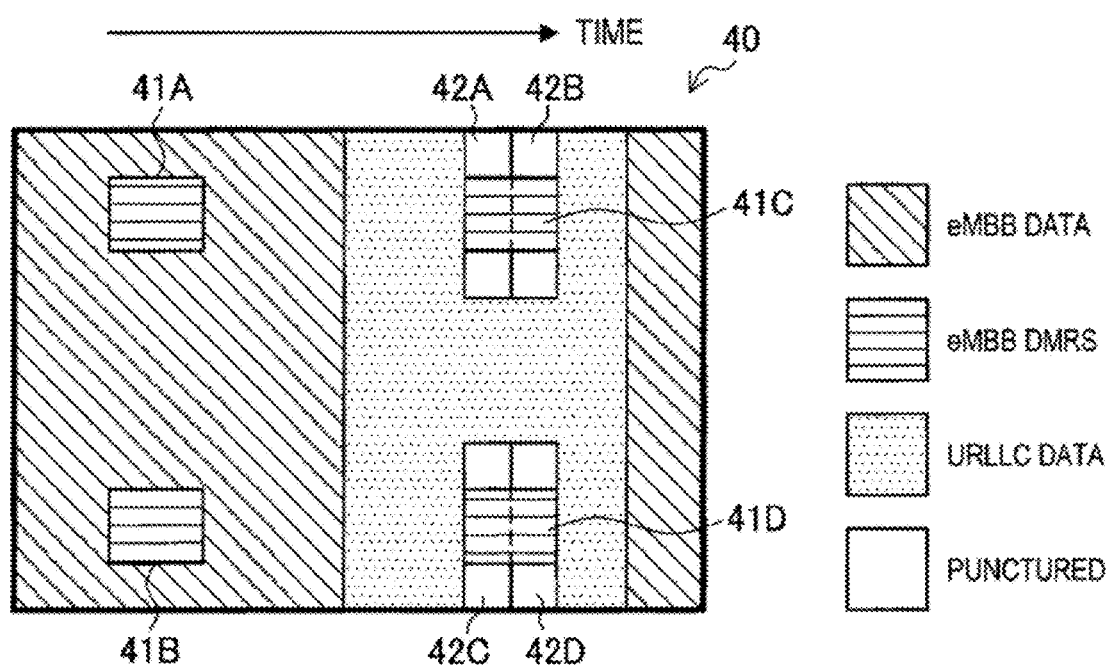
FIG. 11 is a diagram showing an example of dynamic resource sharing for data of different subcarrier spacings according to the present embodiment.

FIG. 11 is a diagram showing an example of dynamic resource sharing for data of different subcarrier spacings according to the present embodiment. The horizontal axis in FIG. 11 is time, the vertical axis is frequency, and one RB 40 is shown. In a case where the sizes of the REs are different between the eMBB data and the URLLC data, puncturing for the URLLC data is preferably performed for all the URLLC REs including the resources corresponding to the eMBB DMRS. In the example shown in FIG. 11, the REs 42A and 42B of the URLLC including the resource corresponding to the RE 41C to which the eMBB DMRS is mapped are punctured. Furthermore, the REs 42B and 42C of the URLLC including the resource corresponding to the RE 41D to which the eMBB DMRS is mapped are punctured.

(2) URLLC Data Reception Setting Information

The following describes the URLLC data reception setting information in dynamic resource sharing in a case where RE sizes are different.

The recognition of the URLLC data reception setting information and the reception processing based on the URLLC data reception setting information are performed in a similar manner to the method described in <3.2.1. Case Where RE Sizes are the Same>. However, the contents of the URLLC data reception setting information may be different from <3.2.1. Case Where RE Sizes are the Same>. Therefore, the URLLC data reception setting information will be described below.

First Example

The URLLC data reception setting information may be information based on the URLLC RE size (in other words, subcarrier spacing and/or symbol length). In other words, the URLLC data reception setting information may be provided in notification on the basis of the URLLC RE size. In this case, the URLLC terminal 300 does not have to recognize the mapping pattern and subcarrier spacing of the eMBB DMRS.

The URLLC data reception setting information based on the URLLC RE size is preferably set and/or provided in notification UE-specifically or UE-group-specifically. Furthermore, the UE group in this case is a set of UEs that receive data of the same subcarrier spacing.

Second Example

The URLLC data reception setting information may be information based on a predetermined RE size (in other words, predetermined subcarrier spacing and/or predetermined symbol length). In other words, the URLLC data reception setting information may be provided in notification on the basis of a predetermined RE size.

The predetermined RE size may be the same as or different from the URLLC RE size.

The predetermined RE size may be the eMBB RE size, or in other words, the size of the RE used in the eMBB DMRS. In this case, the URLLC data reception setting information is information indicating a mapping pattern of the eMBB DMRS.

The URLLC data reception information based on a predetermined RE size may be set and/or provided in notification cell-specifically in addition to UE-specifically and UE group-specifically.

The URLLC terminal 300 performs reception processing by puncturing all REs including the resource set and/or provided in notification by the URLLC data reception setting information in the second resource.

Here, the predetermined subcarrier spacing in the predetermined RE size may be any or a combination of the following.

First Example

The predetermined subcarrier spacing may be a subcarrier spacing set cell-specifically or UE-specifically by RRC signaling.

Second Example

The predetermined subcarrier spacing may be a subcarrier spacing used for transmission of a predetermined synchronization signal, a predetermined reference signal, or a physical broadcast channel (PBCH). For example, the subcarrier spacing of the third resource or the fourth resource may be the same as the subcarrier spacing used for transmission of a predetermined synchronization signal, a predetermined reference signal, or a broadcast channel. As a result, since it is not necessary to explicitly provide notification of the subcarrier spacing of the third resource or the fourth resource, overhead can be reduced. Note that a predetermined synchronization signal, a predetermined reference signal, or PBCH may be a synchronization signal, a reference signal, or PBCH corresponding to (in other words, associated or referred to) URLLC data or a resource used for transmission of URLLC data.

Third Example

The predetermined subcarrier spacing is a predefined subcarrier spacing, and may be, for example, 15 kHz.

3.2.3. CSI Feedback (1) Overview of CSI Feedback

In the NR, it is possible to realize optimal radio transmission by performing link adaptation in consideration of the transmission line state in downlink transmission. In link adaptation, the UE measures the transmission line state in downlink using the reference signal for measuring channel state information (CSI) transmitted from the base station, generates CSI feedback information on the basis of the measurement result, and reports (in other words, gives feedback) on the CSI feedback information to the base station.

Here, the UE generates CSI feedback information on the assumption that downlink data is transmitted under predetermined conditions. Specifically, the UE generates CSI feedback information for a case where the error rate is equal to or less than a predetermined value (for example, 0.1) in downlink data transmission.

(2) CSI Feedback in a Case where Dynamic Resource Sharing is Performed

It is desirable that CSI feedback be implemented even in a case where dynamic resource sharing is performed.

Therefore, the URLLC terminal 300 (for example, the reception processing unit 343) gives CSI feedback on the assumption that the second data channel is mapped to the resource other than the third resource that is a part of the second resource in the second resource. This makes it possible to realize optimal link adaptation. However, the resources used to transmit URLLC data may not be known at the time of the CSI feedback. Therefore, in CSI feedback for the URLLC data, it is desirable to make an assumption regarding puncturing according to the occurrence frequency of data of eMBB or URLLC, or the like.

Furthermore, the number of antenna ports to be punctured (or antenna port number) may be further defined in the assumption regarding puncturing for the URLLC data in the CSI feedback. The number of antenna ports to be punctured (or antenna port number) may be set through RRC signaling or DCI signaling.

The assumption regarding puncturing for the URLLC data in the CSI feedback may be any or a combination of the following.

First Example

The URLLC terminal 300 performs CSI feedback in consideration of puncturing indicated by setting information associated with a puncturing pattern set for data reception. Specifically, the URLLC terminal 300 generates CSI feedback information for REs other than the REs for which puncturing is assumed, indicated by the puncturing pattern for data reception, among the REs of the second resource, and gives feedback. Note that the puncturing pattern set for data reception is the puncturing pattern included in the above-described URLLC data reception setting information.

Second Example

The URLLC terminal 300 performs CSI feedback in consideration of puncturing indicated by setting information associated with a puncturing pattern for the CSI feedback. Specifically, the URLLC terminal 300 generates CSI feedback information for REs other than the REs for which puncturing is assumed, indicated by the puncturing pattern for the CSI feedback, among the REs of the second resource, and gives feedback. Here, the puncturing pattern for the CSI feedback may be set and/or provided in notification independently of the puncturing pattern set for data reception.

Hereinafter, an example of the flow of the CSI feedback processing in the second example will be described with reference to FIG. 12.

Figure 12:
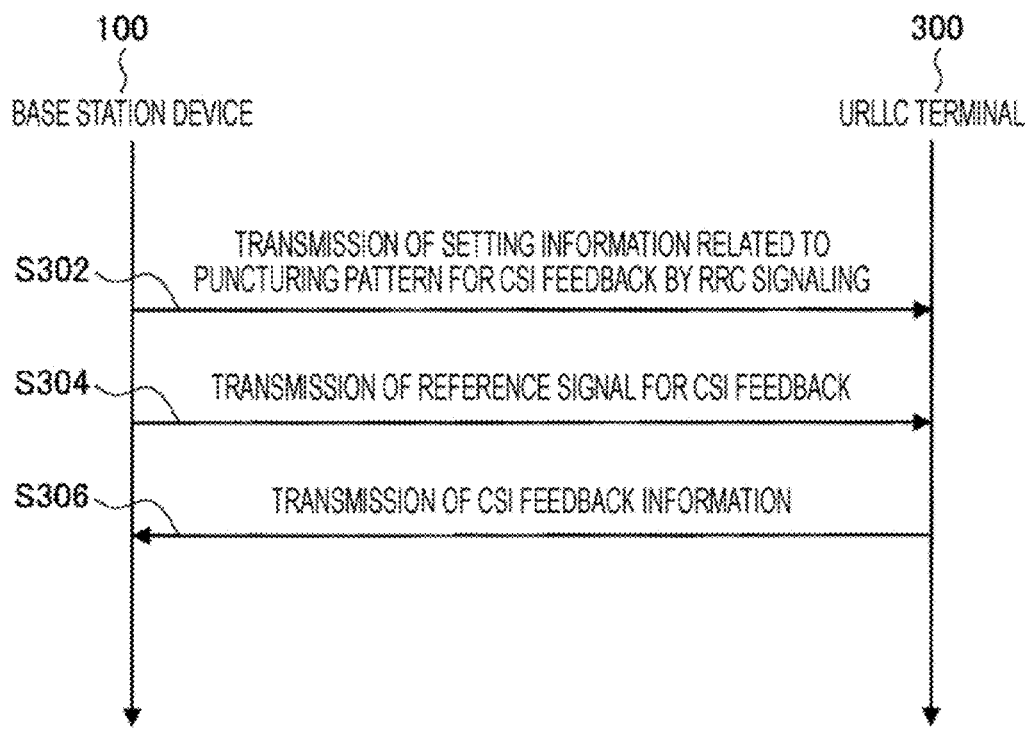
FIG. 12 is a sequence diagram showing an example of a flow of CSI feedback processing executed in the system according to the present embodiment.

FIG. 12 is a sequence diagram showing an example of a flow of CSI feedback processing executed in the system 1 according to the present embodiment. The base station device 100 and the URLLC terminal 300 are involved in this sequence.

First, the base station device 100 transmits setting information associated with a puncturing pattern for the CSI feedback to the URLLC terminal 300 by RRC signaling (step S302). Next, the base station device 100 transmits a reference signal for the CSI feedback to the URLLC terminal 300 (step S304). Then, the URLLC terminal 300 performs CSI feedback in consideration of puncturing indicated by setting information associated with a puncturing pattern for the CSI feedback (step S306).

Third Example

The URLLC terminal 300 performs CSI feedback in consideration of a predetermined puncturing pattern predefined.

The predetermined puncturing pattern defined in advance may include a case where puncturing is not performed. In a case where the predetermined RE puncturing pattern indicates that puncturing is not performed, the URLLC terminal 300 performs CSI feedback without considering the puncturing even in a case where puncturing for the URLL data is actually performed.

4. Application Example

The technology according to the present disclosure can be applied to various products. For example, the base station device 100 may be realized as an evolved Node B (eNB) of any type, such as a macro eNB or a small eNB. The small eNB may be an eNB that covers a cell smaller than a macro cell, such as a pico eNB, a micro eNB, or a home (femto) eNB. Instead, the base station device 100 may be realized as another type of base station such as a Node B or a base transceiver station (BTS). The base station device 100 may include a main body (also referred to as a base station device) that controls wireless communication, and one or more remote radio heads (RRHs) disposed at a location different from the main body. Furthermore, various types of terminals as described later may operate as the base station device 100 by temporarily or semi-permanently executing the base station function.

Furthermore, for example, each of the eMBB terminal 200 and the URLLC terminal 300 may be realized as a mobile terminal such as a smartphone, a tablet personal computer (PC), a notebook PC, a portable game terminal, a portable/dongle type mobile router, or a digital camera, or a vehicle-mounted terminal such as a car navigation device. Furthermore, each of the eMBB terminal 200 and the URLLC terminal 300 may be realized as a terminal (also referred to as a machine type communication (MTC) terminal) that performs machine to machine (M2M) communication. Moreover, each of the eMBB terminal 200 and the URLLC terminal 300 may be a wireless communication module (for example, an integrated circuit module configured with one die) mounted on these terminals.

4.1. Application Example of Base Station Device

First Application Example

Figure 13:
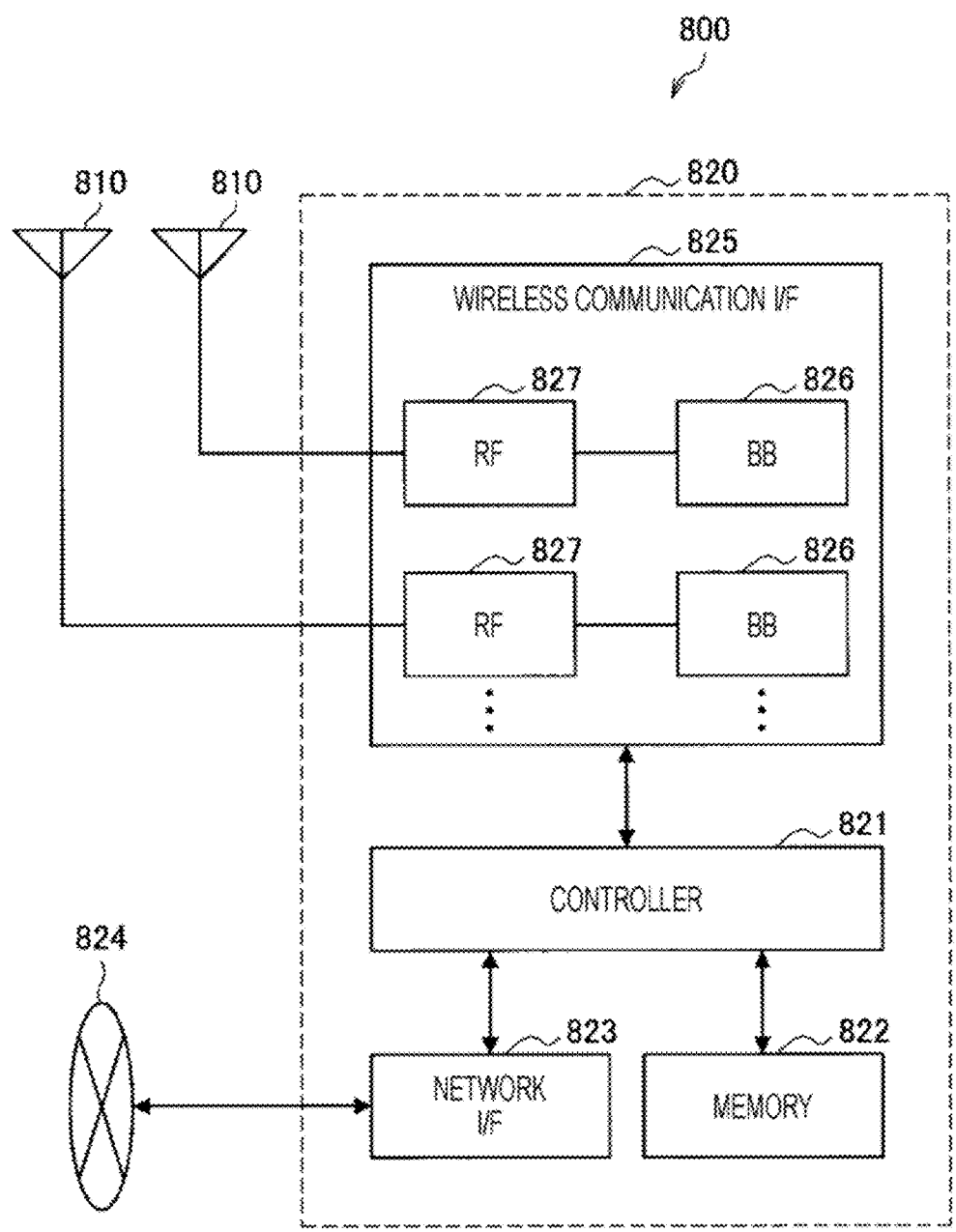
FIG. 13 is a block diagram showing a first example of a schematic configuration of the eNB.

FIG. 13 is a block diagram showing a first example of a schematic configuration of the eNB to which the technology according to the present disclosure may be applied. The eNB 800 has one or more antennas 810 and a base station device 820. Each antenna 810 and the base station device 820 may be connected to each other via an RF cable.

Each of the antennas 810 has a single or a plurality of antenna elements (for example, a plurality of antenna elements constituting a MIMO antenna), and is used for transmission and reception of a wireless signal by the base station device 820. The eNB 800 may have a plurality of antennas 810 as shown in FIG. 13, and the plurality of antennas 810 may correspond to, for example, a plurality of frequency bands used by the eNB 800. Note that FIG. 13 shows an example in which the eNB 800 has the plurality of antennas 810, the eNB 800 may have a single antenna 810.

The base station device 820 includes a controller 821, a memory 822, a network interface 823 and a wireless communication interface 825.

The controller 821 may be, for example, a CPU or a DSP, and operates various functions of the upper layer of the base station device 820. For example, the controller 821 generates a data packet from data in the signal processed by the wireless communication interface 825, and transfers the generated packet through the network interface 823. The controller 821 may generate a bundled packet by bundling data from a plurality of baseband processors and transfer the generated bundled packet. Furthermore, the controller 821 may have a logical function for performing control such as radio resource control, radio bearer control, mobility management, admission control, scheduling, or the like. Furthermore, the control may be performed in cooperation with neighboring eNBs or core network nodes. The memory 822 includes a RAM and a ROM, and stores programs executed by the controller 821 and various control data (for example, terminal list, transmission power data, scheduling data, and the like).

The network interface 823 is a communication interface for connecting the base station device 820 to the core network 824. The controller 821 may communicate with core network nodes or other eNBs via the network interface 823. In that case, the eNB 800 and the core network node or another eNB may be connected to each other by a logical interface (for example, an S1 interface or an X2 interface). The network interface 823 may be a wired communication interface or a wireless communication interface for a wireless backhaul. In a case where the network interface 823 is a wireless communication interface, the network interface 823 may use a higher frequency band for wireless communication than the frequency band used by the wireless communication interface 825.

The wireless communication interface 825 supports any cellular communication scheme such as long term evolution (LTE) or LTE-Advanced, and provides a wireless connection to a terminal located in the cell of the eNB 800 via the antenna 810. The wireless communication interface 825 may typically include a baseband (BB) processor 826, RF circuitry 827, and the like. The BB processor 826 may perform, for example, coding/decoding, modulation/demodulation, multiplexing/demultiplexing, or the like, and performs various signal processing of each layer (for example, L1, medium access control (MAC), radio link control (RLC), and packet data convergence protocol (PDCP). The BB processor 826 may have some or all of the logical functions described above instead of the controller 821. The BB processor 826 may be a module including a memory that stores a communication control program, a processor that executes the program, and a module including related circuits, and the function of the BB processor 826 may be changed by updating the program. Furthermore, the module may be a card or a blade inserted into a slot of the base station device 820, or may be a chip mounted on the card or the blade. Meanwhile, the RF circuit 827 may include a mixer, a filter, an amplifier, and the like, and transmits and receives a wireless signal through the antenna 810.

The wireless communication interface 825 may include a plurality of BB processors 826 as shown in FIG. 13, and the plurality of BB processors 826 may correspond to, for example, a plurality of frequency bands used by the eNB 800. Furthermore, the wireless communication interface 825 may include a plurality of RF circuits 827 as shown in FIG. 13, and the plurality of RF circuits 827 may correspond to, for example, a plurality of antenna elements. Note that, although FIG. 13 shows an example in which the wireless communication interface 825 includes the plurality of BB processors 826 and the plurality of RF circuits 827, the wireless communication interface 825 may include a single BB processor 826 or a single RF circuit 827.

In the eNB 800 shown in FIG. 13, one or more components (notification unit 151, data channel transmission unit 153, and/or data channel transmission unit 153) included in the processing unit 150 described with reference to FIG. 5 may be mounted in the wireless communication interface 825. Alternatively, at least a part of these components may be mounted in the controller 821. As one example, the eNB 800 may be equipped with a module including a part (for example, the BB processor 826) or all of the wireless communication interface 825 and/or the controller 821, and one or more components may be mounted in the module. In this case, the module may store a program for causing the processor to function as the one or more components (in other words, a program for causing the processor to execute the operation of the one or more components), and execute the program. As another example, a program for causing the processor to function as the one or more components may be installed in the eNB 800, and the wireless communication interface 825 (for example, the BB processor 826) and/or the controller 821 may execute the program. As described above, the eNB 800, the base station device 820, or the module may be provided as a device including the one or more components, and a program for causing the processor to function as the one or more components may be provided. Furthermore, the readable recording medium in which the program described above is recorded may be provided.

Furthermore, in the eNB 800 shown in FIG. 13, the wireless communication unit 120 described with reference to FIG. 5 may be mounted in the wireless communication interface 825 (for example, the RF circuit 827). Furthermore, the antenna unit 110 may be mounted on the antenna 810. Furthermore, the network communication unit 130 may be mounted in the controller 821 and/or the network interface 823. Furthermore, the storage unit 140 may be mounted in the memory 822.

Second Application Example

Figure 14:
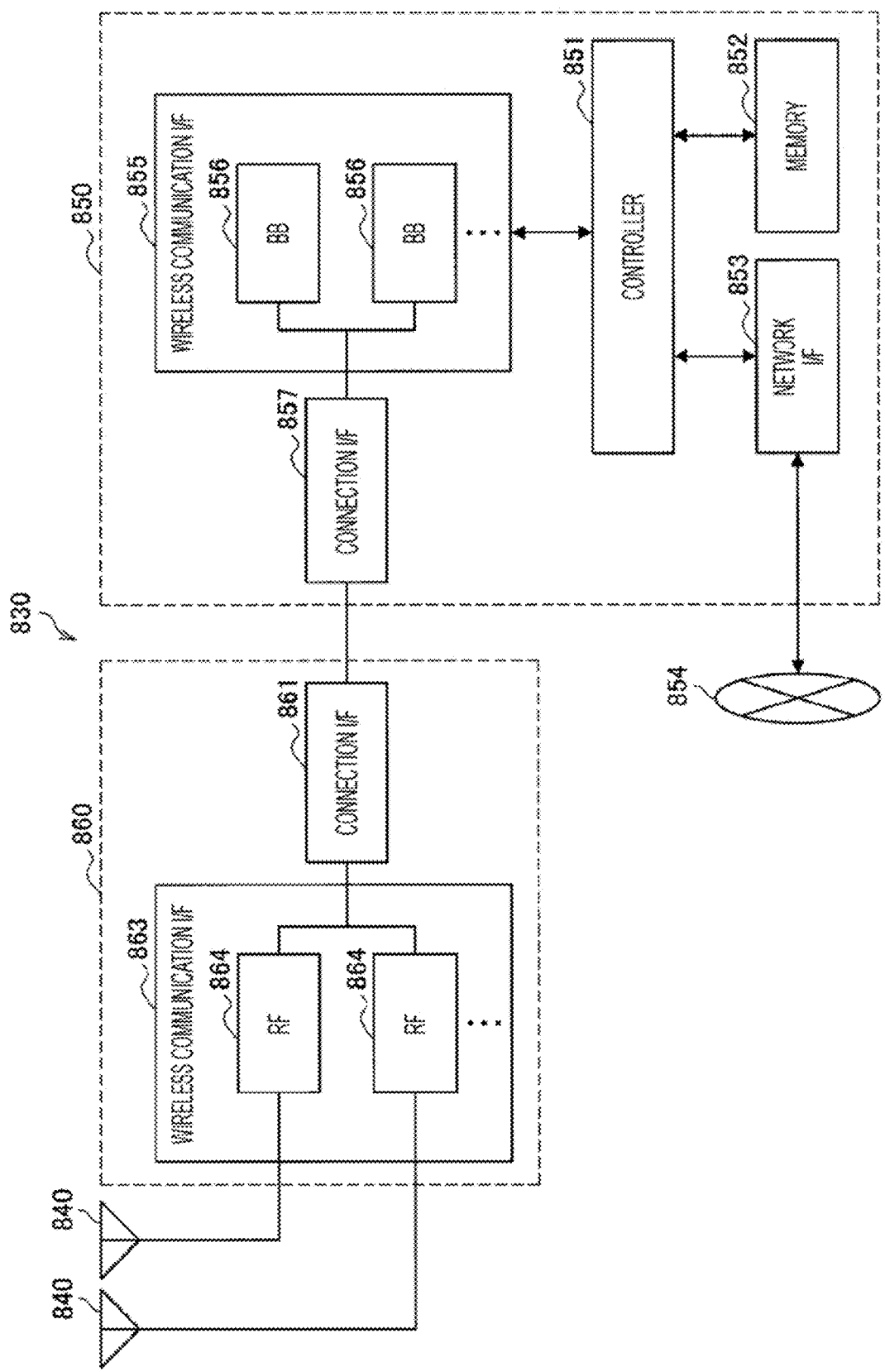
FIG. 14 is a block diagram showing a second example of a schematic configuration of the eNB.

FIG. 14 is a block diagram showing a second example of a schematic configuration of the eNB to which the technology according to the present disclosure may be applied. The eNB 830 includes one or more antennas 840, a base station device 850, and an RRH 860. Each antenna 840 and the RRH 860 may be connected to each other via an RF cable. Furthermore, the base station device 850 and the RRH 860 may be connected to each other by a high speed line such as an optical fiber cable.

Each of the antennas 840 has a single or a plurality of antenna elements (for example, a plurality of antenna elements constituting a MIMO antenna), and is used for transmission and reception of a wireless signal by the RRH 860. The eNB 830 may have a plurality of antennas 840 as shown in FIG. 14, and the plurality of antennas 840 may correspond to, for example, a plurality of frequency bands used by the eNB 830. Note that FIG. 14 shows an example in which the eNB 830 has the plurality of antennas 840, the eNB 830 may have a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 13.

The wireless communication interface 855 supports any cellular communication scheme such as LTE or LTE-Advanced, and provides a wireless connection to terminals located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 13 except that the BB processor 856 is connected to the RF circuit 864 of the RRH 860 via the connection interface 857. The wireless communication interface 855 may include a plurality of BB processors 856 as shown in FIG. 14, and the plurality of BB processors 856 may correspond to, for example, a plurality of frequency bands used by the eNB 830, respectively. Note that, although FIG. 14 shows an example in which the wireless communication interface 855 includes a plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high speed line that connects the base station device 850 (wireless communication interface 855) and the RRH 860.

Furthermore, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include an RF circuit 864 and the like. The RF circuit 864 may include a mixer, a filter, an amplifier, and the like, and transmits and receives a wireless signal through the antenna 840. The wireless communication interface 863 may include a plurality of RF circuits 864 as shown in FIG. 14, and the plurality of RF circuits 864 may correspond to, for example, a plurality of antenna elements, respectively. Note that, although FIG. 14 shows an example in which the wireless communication interface 863 includes the plurality of RF circuits 864, the wireless communication interface 863 may include a single RF circuit 864.

In the eNB 830 shown in FIG. 14, one or more components (notification unit 151, data channel transmission unit 153, and/or data channel transmission unit 153) included in the processing unit 150 described with reference to FIG. 5 may be mounted in the wireless communication interface 855 and/or the wireless communication interface 863. Alternatively, at least a part of these components may be mounted in the controller 851. As one example, the eNB 830 may be equipped with a module including a part (for example, the BB processor 856) or all of the wireless communication interface 855 and/or the controller 851, and one or more components may be mounted in the module. In this case, the module may store a program for causing the processor to function as the one or more components (in other words, a program for causing the processor to execute the operation of the one or more components), and execute the program. As another example, a program for causing the processor to function as the one or more components may be installed in the eNB 830, and the wireless communication interface 855 (for example, the BB processor 856) and/or the controller 851 may execute the program. As described above, the eNB 830, the base station device 850, or the module may be provided as a device including the one or more components, and a program for causing the processor to function as the one or more components may be provided. Furthermore, the readable recording medium in which the program described above is recorded may be provided.

Furthermore, in the eNB 830 shown in FIG. 14, for example, the wireless communication unit 120 described with reference to FIG. 5 may be mounted in the wireless communication interface 863 (for example, the RF circuit 864). Furthermore, the antenna unit 110 may be mounted on the antenna 840. Furthermore, the network communication unit 130 may be mounted in the controller 851 and/or the network interface 853. Furthermore, the storage unit 140 may be mounted in the memory 852.

4.2. Application Example of Terminal Device

First Application Example

Figure 15:
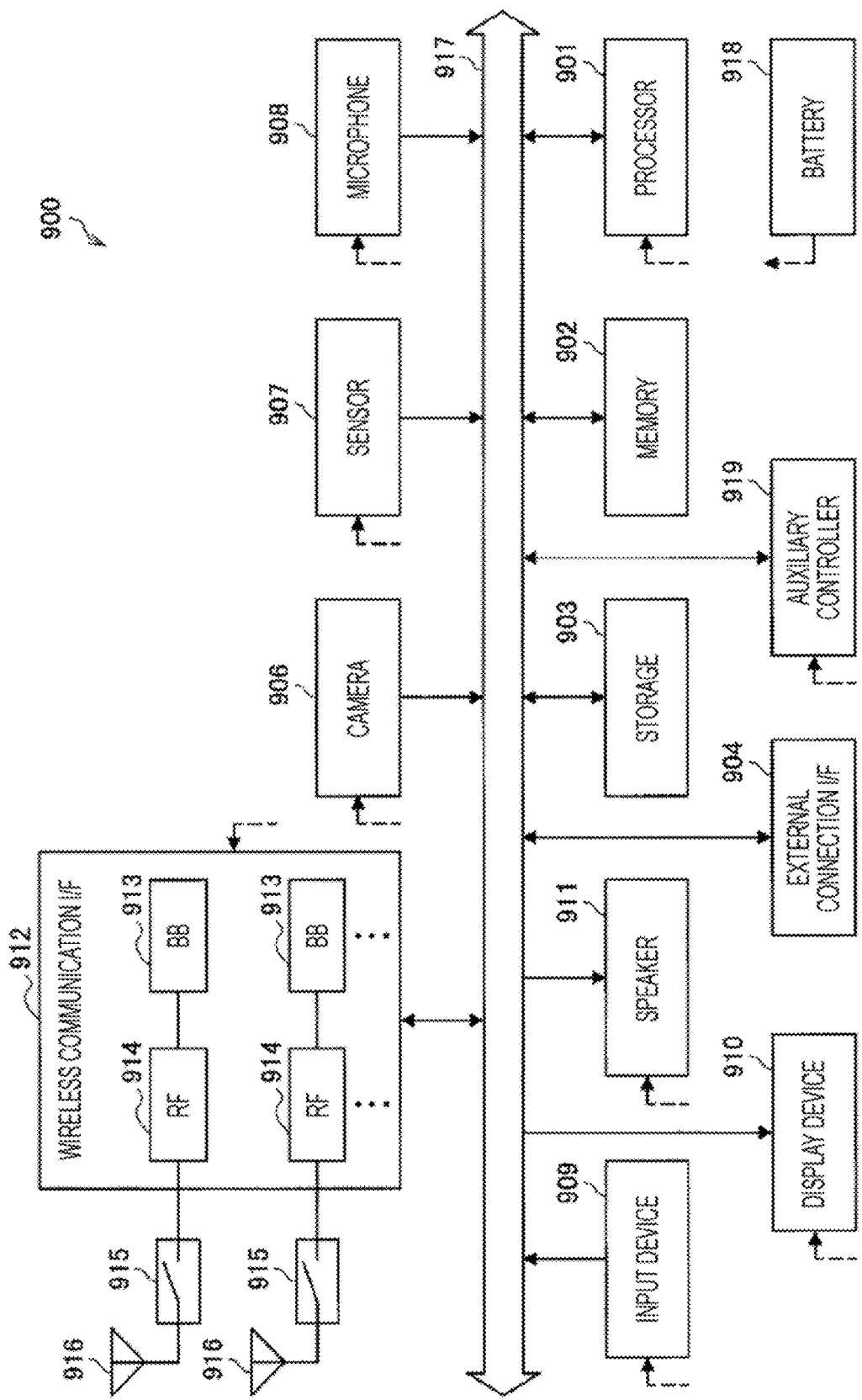
FIG. 15 is a block diagram showing an example of a schematic configuration of a smartphone.

FIG. 15 is a block diagram showing an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores programs and data to be executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 has an imaging element such as a charge coupled device (CCD) or a complementary metal oxide semiconductor (CMOS), and generates a captured image. The sensor 907 may include, for example, a sensor group such as a positioning sensor, a gyro sensor, a geomagnetic sensor, and an acceleration sensor. The microphone 908 converts the sound input to the smartphone 900 into a sound signal. For example, the input device 909 includes a touch sensor, a keypad, a keyboard, a button, a switch, or the like for detecting a touch on the screen of the display device 910, and accepts an operation or information input from the user. The display device 910 has a screen such as a liquid crystal display (LCD) or an organic light emitting diode (OLED) display, and displays an output image of the smartphone 900. The speaker 911 converts the sound signal output from the smartphone 900 into sound.

The wireless communication interface 912 supports any cellular communication scheme such as LTE or LTE-Advanced to perform wireless communication. The wireless communication interface 912 may typically include a BB processor 913, an RF circuit 914, and the like. The BB processor 913 may perform, for example, encoding/decoding, modulation/demodulation, multiplexing/demultiplexing, or the like, and performs various signal processing for wireless communication. Meanwhile, the RF circuit 914 may include a mixer, a filter, an amplifier, and the like, and transmits and receives a wireless signal through the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as shown in FIG. 15. Note that, although FIG. 15 shows an example in which the wireless communication interface 912 includes the plurality of BB processors 913 and the plurality of RF circuits 914, the wireless communication interface 912 may include a single BB processor 913 or a single RF circuit 914.

Moreover, in addition to the cellular communication system, the wireless communication interface 912 may support other types of wireless communication systems, such as a near field communication system, a proximity wireless communication system, or a wireless local area network (LAN) system. In that case, a BB processor 913 and an RF circuit 914 for each wireless communication system may be included.

Each of the antenna switches 915 switches the connection destination of the antenna 916 among a plurality of circuits (for example, circuits for different wireless communication systems) included in the wireless communication interface 912.

Each of the antennas 916 has a single or a plurality of antenna elements (for example, a plurality of antenna elements constituting a MIMO antenna), and is used for transmission and reception of a wireless signal by the wireless communication interface 912. The smartphone 900 may have a plurality of antennas 916 as shown in FIG. 15. Note that although FIG. 15 shows an example in which the smartphone 900 has the plurality of antennas 916, the smartphone 900 may have a single antenna 916.

Moreover, the smartphone 900 may include an antenna 916 for each wireless communication scheme. In that case, the antenna switch 915 may be omitted from the configuration of the smartphone 900.

The bus 917 connects a processor 901, a memory 902, a storage 903, an external connection interface 904, a camera 906, a sensor 907, a microphone 908, an input device 909, a display device 910, a speaker 911, a wireless communication interface 912, and an auxiliary controller 919 with each other. The battery 918 supplies power to each block of the smartphone 900 shown in FIG. 15 through a power supply line partially shown by a broken line in the drawing. For example, the auxiliary controller 919 operates the minimum necessary functions of the smartphone 900 in a sleep mode.

In the smartphone 900 shown in FIG. 15, one or more components (the acquisition unit 241 and/or the reception processing unit 243) included in the processing unit 240 described with reference to FIG. 6 may be mounted in the wireless communication interface 912. Furthermore, in the smartphone 900 shown in FIG. 15, one or more components (the acquisition unit 341 and/or the reception processing unit 343) included in the processing unit 340 described with reference to FIG. 7 may be mounted in the wireless communication interface 912. Alternatively, at least a part of these components may be mounted in the processor 901 or the auxiliary controller 919. As one example, the smartphone 900 may be equipped with a module including a part (for example, the BB processor 913) or all of the wireless communication interface 912, the processor 901, and/or the auxiliary controller 919, and one or more components may be mounted in the module. In this case, the module may store a program for causing the processor to function as the one or more components (in other words, a program for causing the processor to execute the operation of the one or more components), and execute the program. As another example, a program for causing the processor to function as the one or more components may be installed in the smartphone 900, and the wireless communication interface 912 (for example, the BB processor 913), the processor 901, and/or the auxiliary controller 919 may execute the program. As described above, the smartphone 900 or the module may be provided as a device including the one or more components, and a program for causing the processor to function as the one or more components may be provided. Furthermore, the readable recording medium in which the program described above is recorded may be provided.

Furthermore, in the smartphone 900 shown in FIG. 15, for example, the wireless communication unit 220 described with reference to FIG. 6 or the wireless communication unit 320 described with reference to FIG. 7 may be mounted in the wireless communication interface 912 (for example, the RF circuit 914). Furthermore, the antenna unit 210 or the antenna unit 310 may be mounted on the antenna 916. Furthermore, the storage unit 230 or the storage unit 330 may be mounted in the memory 902.

Second Application Example

Figure 16:
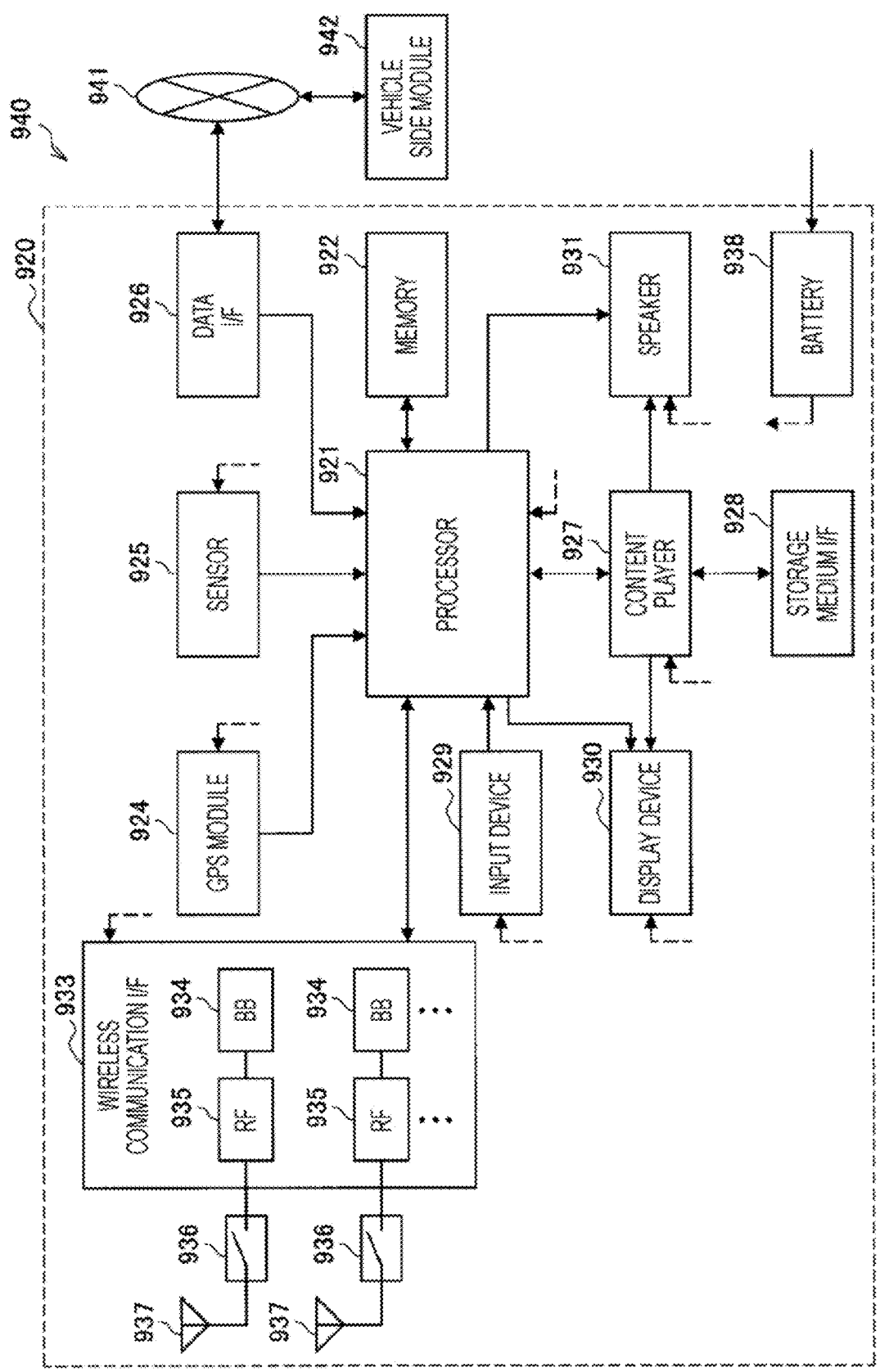
FIG. 16 is a block diagram showing an example of a schematic configuration of a car navigation device.

FIG. 16 is a block diagram showing an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and other functions of the car navigation device 920. The memory 922 includes a RAM and a ROM, and stores programs and data to be executed by the processor 921.

The GPS module 924 uses a GPS signal received from a GPS satellite to measure the location (for example, latitude, longitude, and altitude) of the car navigation device 920. The sensor 925 may include, for example, a sensor group such as a gyro sensor, a geomagnetic sensor, and an air pressure sensor. The data interface 926 is connected to the in-vehicle network 941 via a terminal (not shown), for example, and acquires data generated on the vehicle side such as vehicle speed data.

The content player 927 reproduces the content stored in the storage medium (for example, CD or DVD) inserted in the storage medium interface 928. For example, the input device 929 includes a touch sensor, a button, a switch, or the like for detecting a touch on the screen of the display device 930, and accepts an operation or information input from the user. The display device 930 has a screen such as an LCD or an OLED display, and displays a navigation function or an image of content to be reproduced. The speaker 931 outputs the navigation function or the sound of the content to be reproduced.

The wireless communication interface 933 supports any cellular communication scheme such as LTE or LTE-Advanced to perform wireless communication. The wireless communication interface 933 may typically include a BB processor 934, an RF circuit 935, and the like. The BB processor 934 may perform, for example, encoding/decoding, modulation/demodulation, multiplexing/demultiplexing, or the like, and performs various signal processing for wireless communication. Meanwhile, the RF circuit 935 may include a mixer, a filter, an amplifier, and the like, and transmits and receives a wireless signal through the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as shown in FIG. 16. Note that, although FIG. 16 shows an example in which the wireless communication interface 933 includes the plurality of BB processors 934 and the plurality of RF circuits 935, the wireless communication interface 933 may include a single BB processor 934 or a single RF circuit 935.

Moreover, in addition to the cellular communication system, the wireless communication interface 933 may support other types of wireless communication systems, such as a near field communication system, a proximity wireless communication system, or a wireless LAN system. In that case, a BB processor 934 and an RF circuit 935 for each wireless communication system may be included.

Each of the antenna switches 936 switches the connection destination of the antenna 937 among a plurality of circuits (for example, circuits for different wireless communication systems) included in the wireless communication interface 933.

Each of the antennas 937 has a single or a plurality of antenna elements (for example, a plurality of antenna elements constituting a MIMO antenna), and is used for transmission and reception of a wireless signal by the wireless communication interface 933. The car navigation device 920 may have a plurality of antennas 937 as shown in FIG. 16. Note that although FIG. 16 shows an example in which the car navigation device 920 has the plurality of antennas 937, the car navigation device 920 may have a single antenna 937.

Moreover, the car navigation device 920 may include an antenna 937 for each wireless communication scheme. In that case, the antenna switch 936 may be omitted from the configuration of the car navigation device 920.

The battery 938 supplies power to each block of the car navigation device 920 shown in FIG. 16 through a power supply line partially shown by a broken line in the drawing. Furthermore, the battery 938 accumulates power supplied from the vehicle side.

In the car navigation device 920 shown in FIG. 16, one or more components (the acquisition unit 241 and/or the reception processing unit 243) included in the processing unit 240 described with reference to FIG. 6 may be mounted in the wireless communication interface 933. Furthermore, in the car navigation device 920 shown in FIG. 16, one or more components (the acquisition unit 341 and/or the reception processing unit 343) included in the processing unit 340 described with reference to FIG. 7 may be mounted in the wireless communication interface 933. Alternatively, at least a part of these components may be mounted in the processor 921. As one example, the car navigation device 920 may be equipped with a module including a part (for example, the BB processor 934) or all of the wireless communication interface 933 and/or the processor 921, and one or more components may be implemented in the module. In this case, the module may store a program for causing the processor to function as the one or more components (in other words, a program for causing the processor to execute the operation of the one or more components), and execute the program. As another example, a program for causing the processor to function as the one or more components may be installed in the car navigation device 920, and the wireless communication interface 933 (for example, the BB processor 934) and/or the processor 921 may execute the program. As described above, the car navigation device 920 or the module may be provided as a device including the one or more components, and a program for causing the processor to function as the one or more components may be provided. Furthermore, the readable recording medium in which the program described above is recorded may be provided.

Furthermore, in the car navigation device 920 shown in FIG. 16, for example, the wireless communication unit 220 described with reference to FIG. 6 or the wireless communication unit 320 described with reference to FIG. 7 may be mounted in the wireless communication interface 933 (for example, the RF circuit 935). Furthermore, the antenna unit 210 or the antenna unit 310 may be mounted on the antenna 937. Furthermore, the storage unit 230 or the storage unit 330 may be mounted in the memory 922.

Furthermore, the technology according to the present disclosure may be realized as an in-vehicle system (or vehicle) 940 including one or more blocks of the car navigation device 920, the in-vehicle network 941, and a vehicle-side module 942. The vehicle-side module 942 generates vehicle side data such as vehicle speed, engine speed, or failure information, and outputs the generated data to the in-vehicle network 941.

5. Conclusion

An embodiment of the present disclosure has been described above in detail with reference to FIGS. 1 to 16. As described above, the eMBB terminal 200 acquires the first control information provided in notification from the base station device 100, and on the basis of the first control information, performs reception processing of the eMBB data and the eMBB DMRS scheduled to the first resource. Furthermore, the eMBB terminal 200 acquires the second control information provided in notification from the base station device 100, and on the basis of the second control information, performs reception processing of the eMBB data that is mapped to a resource other than the second resource that is a part of the first resource in the first resource on the assumption that the eMBB DMRS is mapped to the first resource including the second resource. Even in a case where the second resource that is a part of the first resource is punctured, the base station device 100 maps the eMBB DMRS to the first resource including the second resource. Therefore, the eMBB terminal 200 can receive the eMBB DMRS without loss and use the eMBB DMRS for demodulating eMBB data. This makes it possible to avoid the characteristic degradation of the eMBB data due to puncturing.

Furthermore, the URLLC terminal 300 acquires the third control information provided in notification from the base station device 100, and performs reception processing of the second data channel scheduled to the second resource that is a part of the first resource on the basis of the third control information. In particular, the URLLC terminal 300 performs reception processing on the assumption that the second data channel is mapped to the resource other than the third resource that is a part of the second resource in the second resource. More simply, the URLLC terminal 300 performs reception processing of the URLLC data transmitted in the second resource except for the third resource corresponding to the resource to which the eMBB DMRS is mapped. As described above, the URLLC terminal 300 can avoid characteristic degradation of the URLLC data by excluding the eMBB DMRS from reception targets.

While preferred embodiment of the present disclosure has been described in detail with reference to the accompanying drawings, the technical scope of the present disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

For example, although eMBB and URLLC are mentioned as an example of two communication standards in which dynamic resource sharing is performed in the above-described embodiment, the present technology is not limited to this example. The present technology is applicable for dynamic resource sharing between any two communication standards.

Furthermore, the processing described using the sequence diagram in the present specification may not necessarily be performed in the illustrated order. Some processing steps may be performed in parallel. Furthermore, additional processing steps may be employed and some processing steps may be omitted.

Furthermore, the effects described in the present specification are merely illustrative or exemplary, and are not limitative. That is, the technique according to the present disclosure can exhibit other effects obvious to those skilled in the art from the description of the present specification together with the effects described above or instead of the effects described above.

Note that the following configuration is also within the technical scope of the present disclosure.

(1)

A terminal device including:
an acquisition unit that acquires first control information and second control information provided in notification from a base station device; and
a reception processing unit that performs reception processing of a first data channel scheduled to a first resource, and a reference signal for demodulating the first data channel, on the basis of the first control information, in which the reception processing unit performs the reception processing of the first data channel mapped to a resource other than a second resource that is a part of the first resource in the first resource on the basis of the second control information on the assumption that the reference signal is mapped to the first resource including the second resource.

(2)

The terminal device according to (1) described above, in which a second data channel scheduled to another device terminal that communicates with the base station device is mapped to the second resource.

(3)

The terminal device according to (1) or (2) described above, in which the second control information is transmitted at a time later than the first control information.

(4)

A terminal device including:

an acquisition unit that acquires third control information provided in notification from a base station device; and a reception processing unit that performs reception processing of a second data channel scheduled to a second resource that is a part of a first resource on the basis of the third control information, in which the reception processing unit performs the reception processing on the assumption that the second data channel is mapped to a resource other than a third resource that is a part of the second resource in the second resource.

(5)

The terminal device according to (4) described above, in which the third resource includes a fourth resource to which a reference signal for demodulating a first data channel mapped to a resource other than the second resource in the first resource is mapped.

(6)

The terminal device according to (4) or (5) described above, in which the acquisition unit acquires fourth control information provided in notification from the base station device, and the fourth control information indicates the third resource.

(7)

The terminal device according to any one of (4) to (6) described above, in which a subcarrier spacing of the third resource is the same as a subcarrier spacing used for transmission of a predetermined synchronization signal, a predetermined reference signal or a broadcast channel.

(8)

The terminal device according to any one of (4) to (7) described above, in which the third resource is predefined.

(9)

The terminal device according to (5) described above or any one of (6) to (8) described above depending from (5) described above, in which the subcarrier spacing of the third resource is the same as a subcarrier spacing of the fourth resource.

(10)

The terminal device according to (5) described above or any one of (6) to (8) described above depending from (5) described above, in which the subcarrier spacing of the third resource is different from a subcarrier spacing of the fourth resource.

(11)

The terminal device according to any one of (4) to (10) described above, in which the reception processing unit gives CSI feedback on the basis of the assumption.

(12)

A base station device including:

a notification unit that notifies a first terminal device of first control information associated with a first resource for the first terminal device, and second control information associated with a second resource for a second terminal device that is a part of the first resource;

a data channel transmission unit that maps a first data channel to a resource other than the second resource in the first resource while scheduling the first data channel to the first resource; and a reference signal transmission unit that maps a reference signal for demodulating the first data channel to the first resource including the second resource.

(13)

A base station device including:

a notification unit that notifies a second terminal device of third control information associated with a second resource for the second terminal device that is a part of a first resource for a first terminal device; and a data channel transmission unit that maps a second data channel to a resource other than a third resource that is a part of the second resource in the second resource while scheduling the second data channel to the second resource.

(14)

A method including:

acquiring first control information and second control information provided in notification from a base station device; and performing, by a processor, reception processing of a first data channel scheduled to a first resource, and a reference signal for demodulating the first data channel, on the basis of the first control information, in which the performing the reception processing includes performing the reception processing of the first data channel mapped to a resource other than a second resource that is a part of the first resource in the first resource on the basis of the second control information on the assumption that the reference signal is mapped to the first resource including the second resource.

(15)

A method including:

acquiring third control information provided in notification from a base station device; and performing, by a processor, reception processing of a second data channel scheduled to a second resource that is a part of a first resource on the basis of the third control information, in which the performing the reception processing includes performing the reception processing on the assumption that the second data channel is mapped to a resource other than a third resource that is a part of the second resource in the second resource.

(16)

A method including:

notifying a first terminal device of first control information associated with a first resource for the first terminal device, and second control information associated with a second resource for a second terminal device that is a part of the first resource;

mapping, by a processor, a first data channel to a resource other than the second resource in the first resource while scheduling the first data channel to the first resource; and mapping a reference signal for demodulating the first data channel to the first resource including the second resource.

(17)

A method including:

notifying a second terminal device of third control information associated with a second resource for the second terminal device that is a part of a first resource for a first terminal device; and mapping, by a processor, a second data channel to a resource other than a third resource that is a part of the second resource in the second resource while scheduling the second data channel to the second resource.

(18)

A recording medium in which a program is recorded for causing a computer to function as:

an acquisition unit that acquires first control information and second control information provided in notification from a base station device; and a reception processing unit that performs reception processing of a first data channel scheduled to a first resource, and a reference signal for demodulating the first data channel, on the basis of the first control information, in which the reception processing unit performs the reception processing of the first data channel mapped to a resource other than a second resource that is a part of the first resource in the first resource on the basis of the second control information on the assumption that the reference signal is mapped to the first resource including the second resource.

(19)

A recording medium in which a program is recorded for causing a computer to function as:

an acquisition unit that acquires third control information provided in notification from a base station device; and a reception processing unit that performs reception processing of a second data channel scheduled to a second resource that is a part of a first resource on the basis of the third control information, in which the reception processing unit performs the reception processing on the assumption that the second data channel is mapped to a resource other than a third resource that is a part of the second resource in the second resource.

(20)

A recording medium in which a program is recorded for causing a computer to function as:

a notification unit that notifies a first terminal device of first control information associated with a first resource for the first terminal device, and second control information associated with a second resource for a second terminal device that is a part of the first resource;

a data channel transmission unit that maps a first data channel to a resource other than the second resource in the first resource while scheduling the first data channel to the first resource; and a reference signal transmission unit that maps a reference signal for demodulating the first data channel to the first resource including the second resource.

(21)

A recording medium in which a program is recorded for causing a computer to function as:

a notification unit that notifies a second terminal device of third control information associated with a second resource for the second terminal device that is a part of a first resource for a first terminal device; and a data channel transmission unit that maps a second data channel to a resource other than a third resource that is a part of the second resource in the second resource while scheduling the second data channel to the second resource.

REFERENCE SIGNS LIST

1 System
11 Cell
20 Core network
30 PDN
100 Base station device
102 Component
110 Antenna unit
120 Wireless communication unit
130 Network communication unit
140 Storage unit
150 Processing unit
151 Notification unit
153 Data channel transmission unit
155 Reference signal transmission unit
200 Terminal device, eMBB terminal
210 Antenna unit
220 Wireless communication unit
230 Storage unit
240 Processing unit
241 Acquisition unit
243 Reception processing unit
300 Terminal device, URLLC terminal
310 Antenna unit
320 Wireless communication unit
330 Storage unit
340 Processing unit
341 Acquisition unit
343 Reception processing unit

The invention claimed is:

1. A terminal device comprising:
a wireless transceiver; and
processing circuitry that:
acquires information provided via a notification from a base station device,
wherein the acquired information includes first control information and second control information, and
performs, based on the first control information, reception processing of:
a first data channel scheduled to a first resource, and
a reference signal for demodulating the first data channel,
wherein, based on the second control information, the reception processing is performed on an assumption that:
the first data channel is mapped to a resource in a first part of the first resource other than a second resource, the second resource being embedded in time and frequency in the first part of the first resource, and
the reference signal is mapped to a fourth resource, the fourth resource being embedded in time and frequency in a third resource, the third resource being embedded in time and frequency in the second resource, wherein a second data channel, that is scheduled to another terminal device communicating with the base station device, is mapped to a part of the second resource other than the third resource that is embedded in time and frequency in the second resource and the fourth resource that is embedded in time and frequency in the third resource, and wherein the time and frequency of the fourth resource are smaller than the time and frequency of the third resource which are smaller than the time and frequency of the second resource which are smaller than the time and frequency of the first resource.

2. The terminal device according to claim 1, wherein the second control information is transmitted at a time later than the first control information.

3. A method performed by a wireless communication device, the method comprising:

acquiring information provided via a notification from a base station device, wherein the acquired information includes first control information and second control information; and performing, based on the first control information, reception processing of:

a first data channel scheduled to a first resource, and a reference signal for demodulating the first data channel, wherein, based on the second control information, the reception processing is performed on an assumption that:

the first data channel is mapped to a resource in a first part of the first resource other than a second resource, the second resource being embedded in time and frequency in the first part of the first resource, and the reference signal is mapped to a fourth resource, the fourth resource being embedded in time and frequency in a third resource, the third resource being embedded in time and frequency in the second resource, and wherein a second data channel, that is scheduled to another terminal device communicating with the base station device, is mapped to a part of the second resource other than the third resource that is embedded in time and frequency in the second resource and the fourth resource that is embedded in time and frequency in the third resource, and wherein the time and frequency of the fourth resource are smaller than the time and frequency of the third resource which are smaller than the time and frequency of the second resource which are smaller than the time and frequency of the first resource.

4. A non-transitory computer readable medium in which a program is recorded for causing a wireless communication device to execute a method comprising:

acquiring information provided via a notification from a base station device, wherein the acquired information includes first control information and second control information; and performing, based on the first control information, reception processing of:

a first data channel scheduled to a first resource, and a reference signal for demodulating the first data channel, wherein based on the second control information, the reception processing is performed on an assumption that:

the first data channel is mapped to a resource in a first part of the first resource other than a second resource, the second resource being embedded in time and frequency in the first part of the first resource, and the reference signal is mapped to a fourth resource, the fourth resource being embedded in time and frequency in a third resource, the third resource being embedded in time and frequency in the second resource, and wherein a second data channel, that is scheduled to another terminal device communicating with the base station device, is mapped to a part of the second resource other than the third resource that is embedded in time and frequency in the second resource and the fourth resource that is embedded in time and frequency in the third resource, and wherein the time and frequency of the fourth resource are smaller than the time and frequency of the third resource which are smaller than the time and frequency of the second resource which are smaller than the time and frequency of the first resource.

* * * * *